United States Patent
Yoshida et al.

(10) Patent No.: US 6,793,793 B2
(45) Date of Patent: Sep. 21, 2004

(54) ELECTROCHEMICAL TREATING METHOD SUCH AS ELECTROPLATING AND ELECTROCHEMICAL REACTION DEVICE THEREFOR

(75) Inventors: Hideo Yoshida, 5-33-6, Kumegawa-mati, Higashimurayama-shi, Tokyo (JP); Seizo Miyata, 18-26-3-chome, Shimohoya, Nishitokyo-shi, Tokyo (JP); Yoshihiro Asai, 2-11-4, Higashi-mati, Koganei-shi, Tokyo (JP); Masato Sone, Koganei (JP); Fumiko Iwao, Narashino (JP); Hiroe Asai, Koganei (JP)

(73) Assignees: Hideo Yoshida, Tokyo (JP); Seizo Miyata, Tokyo (JP); Yoshihiro Asai, Tokyo (JP)

(*) Notice: Subject to any disclaimer, the term of this patent is extended or adjusted under 35 U.S.C. 154(b) by 185 days.

(21) Appl. No.: 10/070,516
(22) PCT Filed: Jul. 30, 2001
(86) PCT No.: PCT/JP01/06525
§ 371 (c)(1),
(2), (4) Date: Mar. 4, 2002
(87) PCT Pub. No.: WO02/16673
PCT Pub. Date: Feb. 28, 2002

(65) Prior Publication Data
US 2003/0019756 A1 Jan. 30, 2003

(51) Int. Cl.⁷ .............................. C25D 5/00; C25D 17/00
(52) U.S. Cl. .................. 205/88; 205/705; 205/722; 204/225; 204/242; 204/275.1
(58) Field of Search .................. 205/88, 705, 722; 204/225, 242, 275.1

(56) References Cited

FOREIGN PATENT DOCUMENTS

| JP | 02-209729 | 8/1990 |
|----|-----------|--------|
| JP | 09-139374 | 5/1997 |
| JP | 10-321991 | 12/1998 |
| JP | 11-087306 | 3/1999 |
| JP | 11-092990 | 4/1999 |
| JP | 11-216437 | 8/1999 |
| JP | 2000-015096 | 1/2000 |
| JP | 2000-063891 | 2/2000 |
| JP | 2000-226671 | 8/2000 |
| JP | 2000-254405 | 9/2000 |

*Primary Examiner*—Robert R. Koehler
(74) *Attorney, Agent, or Firm*—Jordan and Hamburg LLP

(57) ABSTRACT

A novel method of electrochemical treatment such as electroplating, etc. and an electrochemical reaction apparatus thereof which is high in reactability and able to be electrochemically reacted efficiently, which is small or zero in amount of generation of liquid waste such as electrolytic solution and cleaning liquid and therefore, amicable to the environment, and in which it is no more required to clean the electrode, etc. with cleaning liquid after reaction. Electrochemical reaction is executed in a reaction vessel (6) containing matter (5) which is in a supercritical or subcritical state and an electrolytic solution (1), and after reaction, the supercritical or subcritical matter (5) is shifted into a state of the matter (5) before being shifted into a critical state.

22 Claims, 13 Drawing Sheets

FIG.10
(a)
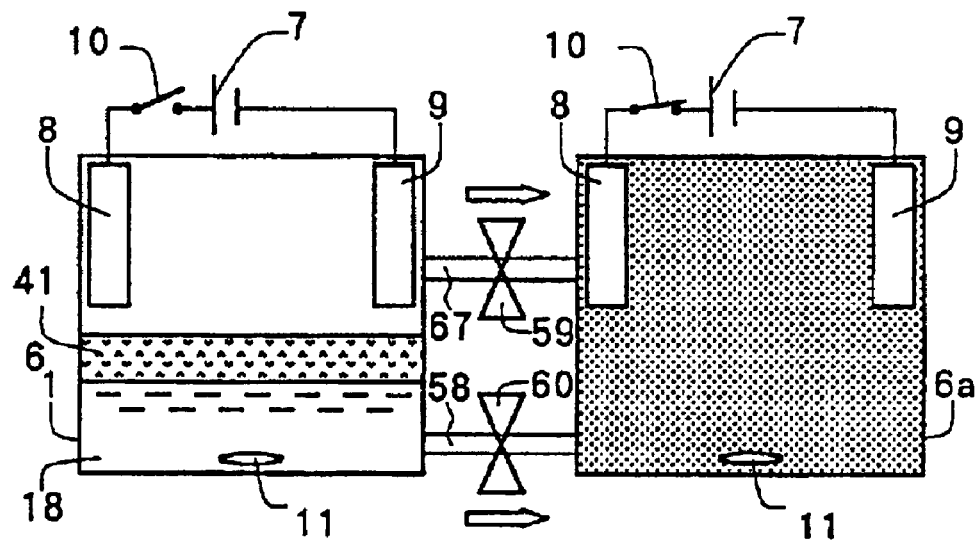
(b)
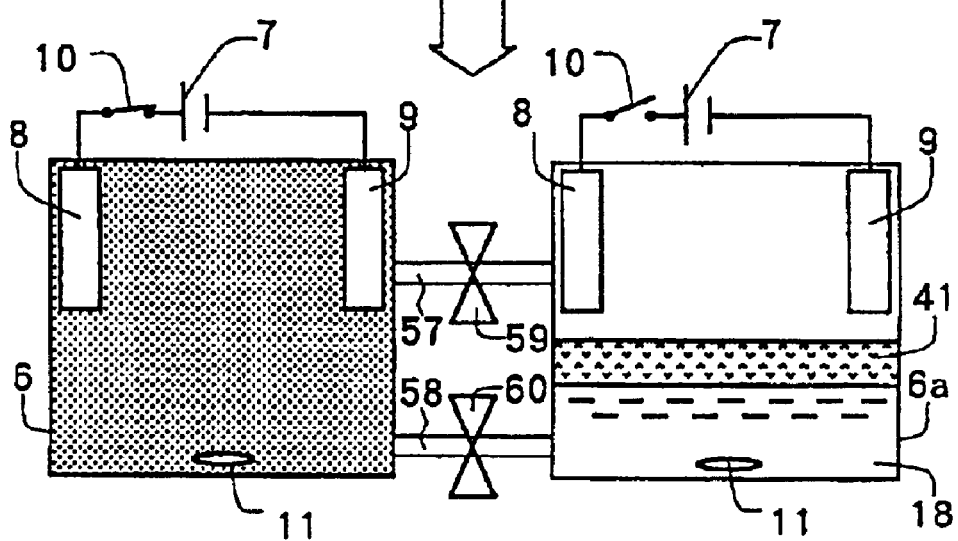

ELECTROCHEMICAL TREATING METHOD SUCH AS ELECTROPLATING AND ELECTROCHEMICAL REACTION DEVICE THEREFOR

TECHNICAL FIELD

This invention relates to a method of electrochemical treatment such as electroplating, etc. and an electrochemical reaction apparatus thereof, which method and apparatus are suited to be used for electrochemical treatment such as, for example, electroplating, and the like, which method and apparatus are capable of executing various treatment processes safely, rationally and rapidly, using supercritical or subcritical matter such as, for example, carbon dioxide, which method and apparatus are capable of processing the used-carbon dioxide, treatment solution, etc. rationally and rapidly, which method and apparatus are capable of suppressing the consumption of the amount of the acid picking solution, plating solution, etc. and reducing the amount of liquid waste generated from the plating operation thereby preventing the pollution of the environment and achieving the improvement of the working environment, the enhancement of productivity and the reuse of the liquid waste, which method and apparatus are capable of attaining a beautiful finishing by remarkably improving the adhesion power of plating, which method and apparatus are capable of easily realizing fine and uniform plating even at the reverse side and recessed-portion of the matter to be treated, which method and apparatus are capable of attaining the elimination miniaturization and light-weight of a vessel(s) required for each treatment thereby achieving the reduction of the cost of equipment and the compactness of the installation space, and which method and apparatus are capable of executing electrochemical reaction rationally and efficiently by pressurizing the reaction vessel and suppressing electrolysis of a solvent in the electrolytic solution for the enhancement of electric current efficiency, thereby obtaining a fine and thin metallic film.

BACKGROUND ART

As a representative example of a convention electrochemical reaction, there can be listed electroplating. The electroplating plays an important role in industrial use such as decoration, corrosion prevention, corrosion resistance, rust prevention and the like. Also, as an example of a method of mass production of a specific metal, there can be listed electrorefining. Besides the above, as examples of electrochemical treatment in which application of an external electric field is employed, there can be listed electroforming, electrophoretic coating and the like, which are all in the category of cathodizing treatment, and formation of anodic oxide film of aluminum, electrochemical polishing, electrochemical machining, electrophoretic plating and the like, which are all in the category of anodizing treatment. Moreover, as examples of a method in which application of an external electric field is not employed, there can be listed electroless plating, chemical conversion treatment and the like.

Various attempts have heretofore been made in order to improve the reaction efficiency or to improve the uniformity and adhesion power of film in respect of the above-mentioned various electrochemical reaction methods.

As one example of them, a method is known in which a surface active agent is used. The surface active agent plays an important role in suppressing gas generated from electrochemical reaction, breaking water, suppressing the occurrence of stain, assisting drying and the like.

In addition, by using the surface active agent, reaction can be executed without using any auxiliary electrode even at a feeble electric current portion with high electric characteristics. Owing to this feature, the consumption of electric power can be reduced and the speed of deposition and dissolution can be increased. As a result, the leveling effect can be increased.

However, the surface active agent is actually not used because of its high price, complicated process, etc. Therefore, development of a new technique is demanded which is capable of enhancing the reactability and reaction efficiency and improving the uniformity and adhesion power of the film.

Also, in the technical field of electrochemical reaction such as electroplating, etc., there is encountered with a problem of treatment of liquid waste such as used-plating solution. This is regarded as a problem to be solved as more rapidly as possible with the increasing concern about the environment problem.

The liquid waste treatment includes three stages of process, namely, decomposition of toxic matter contained in liquid waste, separation and removal of toxic matter from the liquid waste, and treatment and disposal of the separated matter.

Especially, with respect to the separation of toxic matter from the liquid waste, a method is widely accepted, in which a chemical is applied to the liquid waste to solidify the toxic matter and then the solidified toxic matter is removed.

However, this method is, in many cases, executed using a large scaled-equipment which, in general, cannot be said very efficiency and it cannot fully cope with the problem of treatment of liquid waste under the recent increasing strict restriction by rules and regulations.

Moreover, conventionally, it was necessary to clean the target matter such as a plated electrode after electrochemical reaction. This cleaning process is normally executed by rinsing the target matter in stored water, exposing the target matter to running water or the like. Thus, it gives rise to a problem that the process becomes complicated. Moreover, the solution used for cleaning becomes a large quantity of liquid waste and this again raises the above-mentioned problem of treatment of liquid waste.

The conventional electroplating process can roughly be classified into a preceding treatment process (namely, pre-treatment process), a plating treatment process and a succeeding treatment process (namely, post-treatment process). Of these treatment processes, the preceding treatment process includes a step of degreasing and cleaning. In ordinary practice, this preceding treatment process is executed in an exclusive-use vessel containing a prescribed treatment solution, the vessel being then heated and the matter to be treated being then immersed in the treatment solution for a predetermined time.

Therefore, a plurality of vessels and work spaces for them are required which results in high cost of the equipment. Moreover, a poor working environment is created where work must be done under such circumstance that the treatment solution is scattered and hazardous gases are generated. In addition, since it takes a long time for immersing the matter to be treated in the treatment solution, productivity is lowered.

As a degreasing/cleaning method, various methods are proposed such as, alkali heating, electrocleaning, solvent cleaning, emulsion cleaning and the like. However, all of them require the use of chemicals and special equipment. Moreover, it is required for them to immerse the matter to be treated in various treatment solutions or expose the matter to be treated to evaporation of the treatment solutions. Therefore, much time is required for them to break water.

As one attempt to solve such problems, Japanese Patent Application Unexamined Publication No. 2000-63891, for example, discloses a cleaning apparatus in which carbon dioxide in a supercritical state is supplied into a chamber of small capacity and contacted with matter to be cleaned which is stored in the chamber, and then, the matter to be cleaned is heated or vibrated so that the PCB adhered to the matter to be cleaned is dissolved and removed.

In this conventional cleaning apparatus, the carbon dioxide in a critical state is all discharged to the atmospheric air after the cleaning operation is finished. Therefore, in the case where an electroplating product having a larger capacity than the above-mentioned chamber is to be cleaned, the consumption of carbon dioxide is increased, thus making the method of using this conventional apparatus expensive. Moreover, it can be expected that the working environment is deteriorated due to discharge of carbon dioxide. Thus, this conventional apparatus is difficult to be actually put into practice.

Moreover, the conventional plating process requires a plurality of water washing treatment processes which are located adjacent to the plating vessel(s) and water must be normally supplied to the main water washing vessel. This makes the equipment cost high. In addition, the consumption of water is increased.

Moreover, it is very troublesome and labor consuming to recollect the plating solution (so-called pumping back) at the time of taking the matter to be plated out of the plating vessel. In addition, since the recollected solution must be condensed, productivity is very low.

On the other hand, the conventional plating technique is generally poor in adhesion power of plating and the plating is hardly adhered to the reverse side and recessed part of the matter to be treated where electric current density is low. Therefore, when such area of the matter to be treated is the target area to be plated, change of direction must be made before the plating treatment is executed or otherwise, it is required to install a secondary electrode at such area. Accordingly, this conventional plating technique cannot cope with the requirement for plating a deformed matter.

Moreover, in the conventional succeeding treatment process (post-treatment process), the matter already subjected to plating treatment is washed in water, then washed in hot water and then dried. Much time is required for this succeeding treatment process and so productivity is low.

Moreover, the liquid waste discharged from plating factories is restricted in its quality by laws. Of all the discharged liquid waste produced as a result of plating operation, the cleaning liquid waste is, in general practice, added with a prescribed chemical(s) so as to become non-hazardous and thereafter, the heavy metal is removed in the form of a hydroxide by PH adjustment. And the discharged liquid waste having high concentration is processed by being added to the discharged cleaning liquid waste little by little. Or otherwise, such high concentration discharged liquid waste is separately treated and the treated water is mixed with a thin discharged cleaning liquid waste and then disposed.

However, the conventional discharged liquid waste treatment requires expensive equipment, various kinds of chemicals, a large amount of water and much time, and its productivity is very low.

As one attempt to solve those problems, the present applicant has developed a method of electrochemical reaction in which matter shifted into a supercritical state, an electrolytic solution and a surface active agent are introduced into a reaction vessel and emulsified. In that emulsified state, the electroplating is executed. After the plating treatment is executed, the supercritical matter is evaporated and discharged to the outside of the vessel. In doing so, the reaction vessel and the electrode, etc. can be cleaned without the need of a cleaning liquid. The present applicant has already filed a patent application with respect to the above method invention under Japanese Patent Application No. 2000-253572.

On the other hand, in the electroplating treatment, etc., a hydrogen gas and an oxygen gas are produced by electric decomposition of the electrolytic solution and bubbles thereof are stayed on the surface to be treated or moved thereon. As a result, plating omission and non-uniform plating occur. Moreover, since electric energy is consumed due to generation of the gases and the smooth plating treatment is jeopardized to that extent, the electric current efficiency is lowered.

As one attempt to solve this problem, Japanese Patent Application Non-Examined Publication No. 2000-226671, for example, discloses an electroless plating apparatus, in which a surface to be treated is placed in a hermetically closed-space with its face-up posture, the pressure in the space is then raised to a level equal to or higher than the atmospheric pressure, then this pressure is pulsated to dissolve the hydrogen gas bubbles produced with the progress of the reducing reaction at the time of electroless copper plating and accelerate the detachment of them from the surface to be treated.

In the electroless plating, however, hydrogen gas, etc. are necessarily generated with the progress of depositing reaction of plating and the method for suppressing the generation of gas is not practically usable because the suppression of the generation of gas adversely affects the deposition of plating, thus making it unable to execute the plating treatment itself.

That is to say, in the electroless plating treatment, the plating treatment is executed while allowing the generation of hydrogen gas, etc. and a proper stabilizer is applied to the vessel or nitrogen gas is used in order to cope with the unfavorable hydrogen gas.

Accordingly, it is practically impossible to employ the electroless plating treatment method which allows the generation of hydrogen gas, etc. to the electroplating treatment, etc.

Moreover, in the case where the electroplating treatment is executed through the above-mentioned method, an electrode must be disposed opposite to the surface to be treated. If the arrangement is made in this way, the hydrogen gas generated from the surface to be treated stays on the electrode. This prevents the smooth flow or passage of electric current through the electrolytic solution and makes it difficult to execute the electroplating treatment. Thus, the above method is unable to be applied to the electroplating treatment.

It is, therefore, a principal object of the present invention to provide a novel electrochemical reaction method and an electrochemical reaction apparatus thereof, which are high in reactability, in which electrochemical reaction can be executed efficiently, which is small or zero in amount of generation of liquid waste such as electrolytic solution and cleaning liquid and therefore, amicable to the environment, and in which it is no more required to clean the electrode, etc. with cleaning liquid after the reaction.

Another object of the present invention is to provide a method of electrochemical treatment such as electroplating, etc., and an electrochemical reaction apparatus thereof, which are suited to be used for electrochemical treatment such as, for example, electroplating, etc., and which are capable of executing various treatment processes safely, rationally and rapidly, using supercritical or subcritical matter.

A further object of the present invention is to provide a method of electrochemical treatment such as electroplating, etc., and an electrochemical reaction apparatus thereof, which are capable of processing the used-supercritical or subcritical matter such as carbon dioxide, treatment solution, etc. rationally and rapidly, which are capable of suppressing the amount of use of the acid picking solution, plating solution, etc. and reducing the amount of liquid waste generated from plating operation thereby preventing the pollution of the environment and achieving the improvement of the working environment, the enhancement of productivity and the reuse of the liquid waste.

A still further object of the present invention is to provide a method of electrochemical treatment such as electroplating, etc., and an electrochemical reaction apparatus thereof, which are capable of providing a beautiful finishing by remarkably improving the adhesion power of plating, and which are capable of easily realizing fine and uniform plating even at the reverse side and recessed-portion of the matter to be treated.

A yet further object of the present invention is to provide a method of electrochemical treatment such as electroplating, etc., and an electrochemical reaction apparatus thereof, which are capable of attaining elimination, miniaturization and light-weight of a vessel(s) required for each plating treatment thereby achieving reduction of the cost of equipment and compactness of the installation space.

An additional object of the present invention is to provide a method of electrochemical treatment such as electroplating, etc., and an electrochemical reaction apparatus thereof, which are suited to be used for electrochemical treatment such as, for example, electroplating, etc., and which are capable of executing electrochemical reaction rationally and efficiently by pressurizing the reaction vessel and suppressing electrolysis of a solvent in the electrolytic solution for the enhancement of electric current efficiency, thereby obtaining a fine and thin metallic film.

DISCLOSURE OF INVENTION

According to one aspect of the present invention, reaction is executed in a vessel containing matter shifted into a supercritical or subcritical state and an electrolytic solution. The expression "supercritical state" herein used refers to a state which is kept under a temperature/pressure higher than the critical point indicated in an entropy chart of temperature and pressure in a phase diagram. The matter shifted in this state is not in the form of gas nor liquid. According to this means, the reaction vessel is equalized in quality by the supercritical matter having a high diffusion constant and ion is efficiently supplied to the peripheral area of the electrode, etc., thereby enhancing the reactability. Moreover, since a small amount of electrolytic solution is good enough, the amount of liquid waste to be treated can be suppressed.

Moreover, by executing the reaction in a reaction vessel which contains therein supercritical matter, an electrolytic solution and a surface active agent and which is emulsified, the supercritical matter and the electrolytic solution are more uniformly dispersed and the reaction efficiency is enhanced at the surface of the electrode, etc.

The matter shifted into the supercritical state is at least one selected from the group of carbon dioxide, methane trifluoride, ethane, propane, butane, benzene, methylether and chloroform.

After the electrochemical reaction is executed, the matter in the supercritical state is shifted into a state equal to a critical point or lower. The supercritical matter is abruptly evaporated or liquefied by reducing pressure after the reaction. Accordingly, a flow is vigorously generated in the system so that impurities on the surface of the electrode, etc. are cleaned by being blown off.

In the electrochemical reaction method, the reaction in the reaction vessel is electroplating, electroforming, formation of an anodic oxide film, electrochemical polishing, electrochemical machining, electrophoretic coating, electrorefining, chemical conversion treatment, or electroless plating. Therefore, the industrial field to which the present invention is applicable can be specified.

That is to say, in the various industrial field of the above mentioned electroplating, etc., reaction is executed efficiently by storing supercritical matter, an electrolytic solution and a surface active agent, if necessary, in an electrolytic bath (or plating bath, treatment solution or the like).

Moreover, according to another aspect of the present invention, a reaction vessel containing an electrolytic matter and an electrolytic solution therein is shifted into a supercritical or subcritical state and in that state, the electrolytic matter is electrolyzed or the electrolyzed electrolytic matter and/or electrolytic matter contained in the electrolytic solution is deposited and adhered to the other electrode matter. Accordingly, the present invention is suited to be used for electrochemical treatment such as electroplating. For example, by using a carbon dioxide in a supercritical or subcritical state, the various treatment processes can be executed safely, rationally and rapidly. Moreover, the adhesion power of plating is remarkably improved, a beautiful finishing can be obtained, fine and uniform plating is realized even at the reverse side and recessed-portion of the matter to be treated and the productivity is enhanced. The treatment of the present invention can be applied to an electroforming method, an anodic oxide film formation method, and an electrochemical polishing method with the result of enhanced productivity and beautiful finishing.

Moreover, according to another aspect of the present invention, a reaction vessel containing an electrolytic matter therein is shifted into a supercritical or subcritical state, and in that state, the electrolytic matter is electrolyzed so as to be collected on the other electrode matter side. Accordingly, the present invention can be applied to a metal electrolytic extraction and refining method with the result of enhanced productivity and beautiful finishing.

Moreover, according to another aspect of the present invention, a reaction vessel containing an electrolytic matter therein is shifted into a supercritical or subcritical state- and in that state, the electrolytic matter is deposited and adhered to the matter to be treated. Accordingly, the present invention can be applied to an electroplating and chemical conversion treatment method without a need of a provision of an external electric field and with the result of enhanced productivity and beautiful finishing.

Moreover, according to another aspect of the present invention, after the electrolytic matter is electrolyzed or the electrolyzed electrode matter and/or the electrolytic matter contained in the electrolytic solution is deposited and adhered to the other electrode matter, or after the electrolytic matter is electrolyzed and the electrolyzed matter is collected at the other electrode matter side, the reaction vessel is shifted from the supercritical or subcritical state into the above-mentioned state equal to or lower than the critical point and then, the electrolytic solution and the supercritical or subcritical matter is brought back into a double-layer state and discharged. At the time of shifting, a vigorous flow is generated in the system of the reaction vessel, etc. so as to accelerate the cleaning and drying of the matter to be treated.

Moreover, according to another aspect of the present invention, after the electrode matter or electrolytic matter is electrolyzed, the matter in a supercritical or subcritical state is introduced into the reaction vessel and then the electrode matter is cleaned or the oxide film is removed therefrom. Accordingly, the various treatments are executed rationally and rapidly and the drying treatment is accelerated.

Moreover, according to another aspect of the present invention, after the electrode matter or electrolytic matter is electrolyzed, matter in a supercritical or subcritical state is introduced into the reaction vessel and the electrode matter or the electrolytic matter collected side is cleaned or dried. Accordingly, the various treatments are executed rationally and rapidly and the drying treatment is accelerated.

Moreover, according to another aspect of the present invention, at the time of electrolyzing the electrode matter, the supercritical or subcritical matter and the surface active agent are introduced into the reaction vessel and the inside of the reaction vessel is emulsified in the supercritical or subcritical state so that the electrode matter or the electrolyzed matter is deposited and adhered uniformly, rapidly and in high density. By doing so, for example, the adhesion power of plating is remarkably improved and a beautiful finishing can be obtained. Moreover, the plating treatment can be executed easily and uniformly even at the reverse side and the recessed part of the matter to be treated, and productivity is enhanced.

Moreover, according to another aspect of the present invention, a supercritical or subcritical matter, an oxide film removing solution and a surface active agent are introduced into the reaction vessel before an electrode matter or an electrolytic matter is electrolyzed, so that the reaction vessel is shifted into a supercritical or subcritical state. And in that state, the inside of the reaction vessel is emulsified. Accordingly, the various treatments are executed rationally, rapidly and in high density.

According to still another aspect of the present invention, reservoir vessels communicable with the reaction vessel are disposed at the outside of the reaction vessel, and the used-supercritical or subcritical matter, the electrolytic solution or cleaning or oxide film removed-matter is reserved in the reservoir vessels. Accordingly, the used-supercritical or subcritical matter, etc. are prevented from being discharged so that they can be reproduced and reused rationally and effectively.

Moreover, according to another aspect of the present invention, the used-supercritical or subcritical matter reserved in the reservoir vessels is reproduced and refluxed to the reaction vessel, or the used electrolytic solution or cleaning or oxide film removed-matter reserved in the reservoir vessels is reproduced and refluxed to the solution reservoir vessels. Accordingly, the used supercritical or subcritical matter and the used electrolytic matter, cleaning or oxide film removing matter or the like can be effectively utilized.

Moreover, according to another aspect of the present invention, a treatment process of deposition and adhesion of the electrode matter, and a preceding treatment process thereof, or an electrolyzing and collecting process of the electrolytic matter and a preceding treatment process thereof are executed in only one reaction vessel. Accordingly, the vessels required for each of the processes can be eliminated. Thus, the cost of the equipment can be lowered and the installation space can be made compact. Moreover, since the troublesome work for moving the matter to be treated for each vessel can be eliminated, the working efficiency is enhanced.

According to another aspect of the present invention, there are employed at least two reaction vessels capable of executing a treatment process of deposition and adhesion of the electrode, and preceding and succeeding treatment processes thereof, or an electrolyzing process of the electrolytic solution, and preceding and succeeding treatment processes thereof. The preceding and succeeding treatment processes are sequentially executed in these reaction vessels. Accordingly, electrochemical reaction of electroplating, etc. and various treatments related thereto can be executed rationally and a mass production thereof can be obtained.

Moreover, according to another aspect of the present invention, after a prescribed treatment process is executed in the reaction vessels, the electrolytic solution, cleaning or oxide film removing matter, or surface active agents in the reaction vessel on the side of the preceding treatment process can be moved into the reaction vessel on the side of the succeeding treatment process. Accordingly, the used solution can be utilized effectively and the cost of treatments can be reduced.

Moreover, according to another aspect of the present invention, after the electrode matter is electrolyzed or after the electrolyzed electrode matter is deposited and adhered to the other electrode matter, multilayer electrode matter is deposited and adhered to the other electrode matter using the reaction vessel. Accordingly, the preceding treatment and the treatment of deposition/adhesion of the electrode matter of the next layer can sequentially be executed without a need of carrying out the matter to be treated from the reaction vessel. Thus, workability and productivity can be enhanced.

According to still another aspect of the present invention, electrochemical reaction is executed by pressurizing the reaction vessel. Accordingly, the electrolysis of the solvent in the electrolytic solution caused by the electrochemical reaction can be suppressed, the generation of hydrogen gas can be suppressed and miniaturization of bubbles thereof and dissolving thereof into the electrolytic solution can be accelerated. Thus, a fine and thin metallic film can be obtained. Moreover, the electric current efficiency can be enhanced and the electrochemical reaction can be executed rationally and efficiently. In addition, since the electrochemical reaction can be realized in a state which is lower in temperature and in pressure than the supercritical state, the energy saving can be achieved to that extent, the equipment can be made small in size and light in weight and the operation cost can be reduced.

According to the present invention, a pressurized fluid is introduced into the reaction vessel so as to pressurize the reaction vessel. Accordingly, there can be obtained a safe and stable electrochemical reaction compared with the case where a pressurized gas is introduced.

Moreover, according to another aspect of the present invention, a surface active agent is applied to the reaction vessel and stirred, the pressurized solution and the electrolytic solution are emulsified to execute the electrochemical reaction and under pressure, a surface active agent is acted on the fine hydrogen gas and oxygen gas efficiently and rapidly. Accordingly, the gas can be peeled off the surface to be treated and dissolved in the electrolytic solution rapidly.

Moreover, according to another aspect of the present invention, before electrochemical reaction of the reaction vessel is executed, the pressurized liquid can be introduced into the reaction vessel and the used-pressurized liquid can be discharged from the reaction vessel. Accordingly, the reaction vessel, the electrodes and the surface to be treated can be cleaned and dried before and after the electrochemical reaction.

According to another aspect of the present invention, before electrochemical reaction of the reaction vessel is executed, the pressurized liquid is introduced into the reaction vessel so as to clean the electrode matter or remove the oxide film therefrom. Accordingly, the preceding treatment can be executed by the pressurized liquid and a stable electrochemical reaction can be realized.

Moreover, according to another aspect of the present invention, after the electrochemical reaction is executed in the reaction vessel, the pressurized liquid is introduced into the reaction vessel so as to clean or dry the electrode matter. Accordingly, the succeeding treatment can be executed by the pressurized liquid and the stability of the next electrochemical reaction can be obtained.

Moreover, according to another aspect of the present invention, reservoir vessels communicable with the reaction vessel are disposed at the outside of the reaction vessel, so that the used-supercritical or subcritical matter, the electrolytic solution or cleaning or oxide film removed-matter can be reserved in the reservoir vessels. Accordingly, the used-supercritical or subcritical matter, etc. can be prevented from being discharged outside and they can be reproduced and used rationally and effectively.

According to still another aspect of the present invention, the used-liquid reserved in the reservoir vessels is reproduced, so that the used-liquid can be refluxed to the reaction vessel, and the used-electrolytic solution or cleaning or oxide film removed-matter reserved in the reservoir vessels is reproduced so that the solution or matter can be refluxed to the solution reservoir vessels. Accordingly, the used pressurized liquid, cleaning liquid, oxygen film removed matter, etc. can be utilized effectively.

The above objects, features and advantages of the present invention will become more manifest from the following detailed description with reference to the accompanying drawings.

BRIEF DESCRIPTION OF DRAWINGS

FIG. 10 is an explanatory view showing an essential part of a fourth mode for carrying out the present invention, in which the respective processes of the plating treatment are executed independently using two reaction vessels.

BEST MODE FOR CARRYING OUT THE INVENTION

Figure 1:
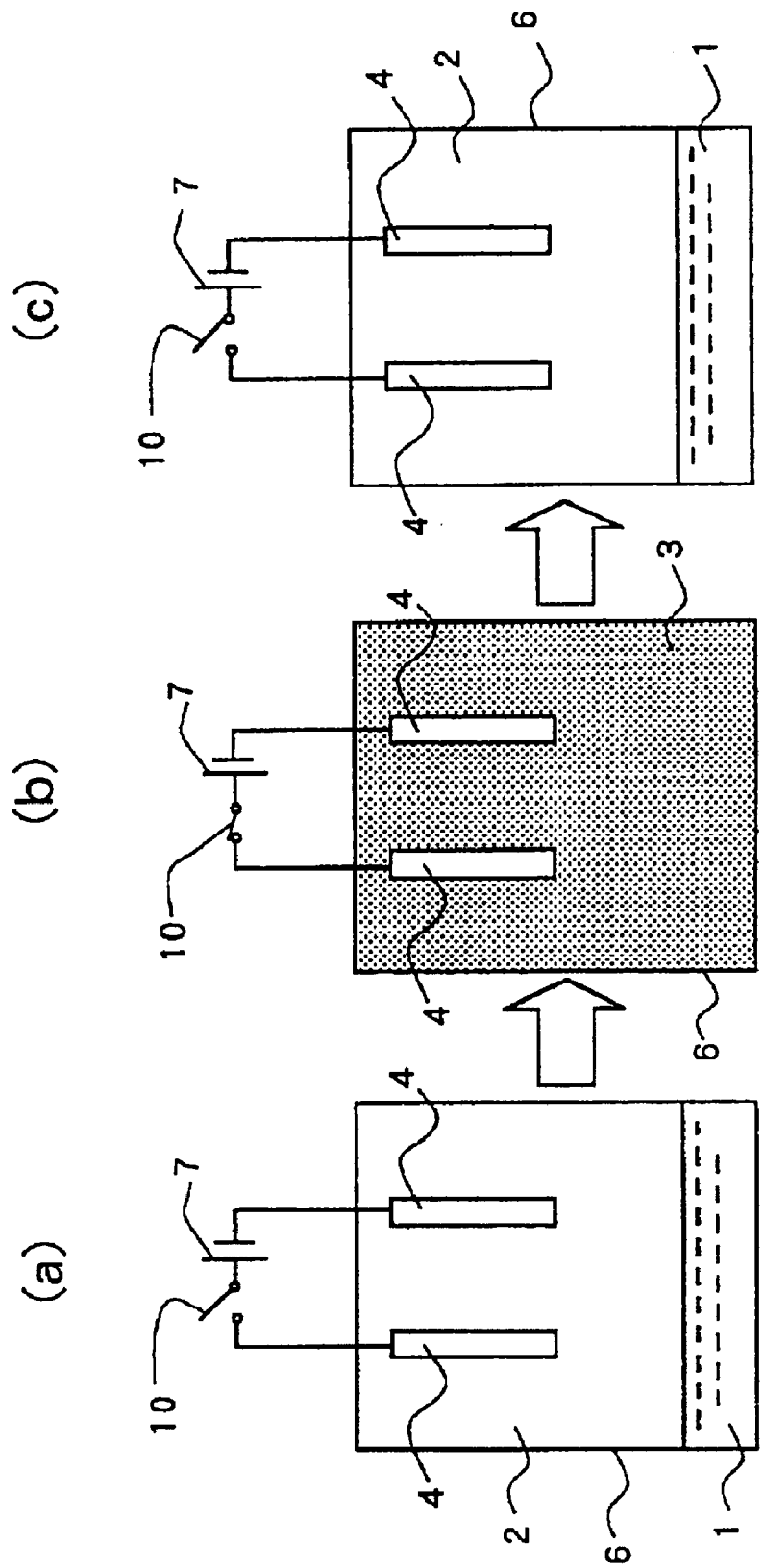
FIG. 1 is an explanatory for showing the reaction processes according to a first mode for carrying out the present invention in the sequential order of (a), (b) and (c).

The mode for carrying out the present invention will be described hereinafter with reference to the drawings. FIG. 1 shows a reaction process through an electrochemical reaction method as a first mode for carrying out the present invention, wherein (a) is a view showing a state before reaction, (b) is a view showing a state under reaction and (c) is a view showing a state after reaction.

This mode is a case where electrodes 4 are installed in a reaction vessel 6 and an external electric field 7 is applied thereto. Accordingly, this mode can be applied commonly to those methods of electroplating, electroforming, formation of an anode electrode oxide film, electrochemical polishing, electrochemical machining, electrophoretic coating, electrorefining and the like.

Even in a case where no external electric field 7 is applied as in the case of electroless plating and chemical conversion treatment, this mode can be carried out, as in the case where the electric field is applied, by immersing matter to be plated (matter to be treated) instead of a provision of a cathode electrode and an anode electrode.

Of all, the state shown in FIG. 1(*a*) is a case where the reaction vessel 6 contains an electrolytic solution 1 and matter 2 equal to or lower than a critical point therein. In the drawings, reference numeral 10 denotes a switch.

The state shown in FIG. (1*a*) is shifted into the state shown in FIG. 1(*b*), in other words, the matter 2 equal to or lower than a critical point is shifted into a supercritical state, so that the matter 2 is brought into a uniform state compatible with the electrolytic solution. Or otherwise, it is also accepted that a surface active agent is applied to the reaction vessel for emulsification.

In order to obtain this supercritical state, it is an ordinary practice that pressure and temperature are raised using a compressor, a heat exchanger or the like.

The surface of each electrode 4 is naturally degreased and cleaned because a flow is generated in the system during the process of obtaining a supercritical state by raising temperature and pressure. Accordingly, the work for degreasing the electrodes 4, which was conventionally required to execute before the reaction process, can be eliminated.

Conventionally, the degreasing work was conducted using a solvent such as trichloroethylene, tetrachloroethylene, trichloroethane or the like. However, those solvents have a strong toxic and there is a fear to bring about the pollution of the environment. Moreover, the restriction standard for them is severe and there is a problem in terms of safety, too.

Since the present invention makes it unnecessary to use those solvent-based degreasing agents, an environment prevention type system can be realized. In spite of the above description, the present invention does not exclude a case where the electrodes are preliminarily degreased and cleaned as conventionally practiced.

Subsequently, in the state shown in FIG. 1(*b*), reaction is executed. Since the matter 2 shifted into a supercritical state has a high diffusion constant, metallic ions, etc. contained in the electrolytic solution are efficiently supplied to the peripheral area of the electrodes 4, the depositing/dissolving speed is increased at the surface of each electrode 4 and the system is normally equalized in quality. Consequently, the power of adhesion and uniformity of the film are also enhanced.

Moreover, since only a small amount of the electrolytic solution 1 is to be used is good enough while maintaining the high reacting efficiency, the amount of liquid waste to be treated can be reduced. This is desirable in terms of environment prevention and cost.

Then, by reducing the pressure or lowering the temperature after reaction is executed, the supercritical matter is shifted back into a state equal to or lower than a critical point, thereby realizing a mutually separated state shown in FIG. 1(*c*).

Since the supercritical matter is abruptly evaporated or liquefied during this process, a vigorous flow is generated to the system, thereby blowing off for cleaning the impurities adhered to the surface of each electrode 4.

Accordingly, cleaning using water, etc., which were conventionally executed after reaction, is no more required. Thus, no liquid waste such as water used for cleaning, etc. is not produced. The mutually separated electrolytic solution 1 and the reaction vessel 6 are recollected, the electrolyte lost by reaction is properly supplemented and the concentration is adjusted. The resultant can be reused.

Each component contained in the reaction vessel 6 will now be described.

First, the matter, which is to be shifted into a supercritical state, is not particularly limited. It may properly be selected from the known gases, liquids and matter taking into consideration the matter-specific critical temperature and critical pressure.

As specific examples, there can be listed carbon dioxide, methane trifluoride (fluoroform), ethane, propane, butane, benzene, methylether and chloroform and the like. Of all of them, carbon dioxide is most preferable in respect of cost, safety, critical conditions, etc. The carbon dioxide is 304.5 K in critical temperature and 7.387 MPa in critical pressure and therefore, the carbon oxide is shifted into a supercritical state only when its temperature and pressure are raised higher than the above.

Incidentally, it is already proposed to apply the supercritical fluid such as carbon dioxide to the coating technique and paint. Specifically, Japanese Patent Application Unexamined Publication No. H05-132656, Japanese Patent Application Unexamined Publication No. H08-231903, International Patent Application Domestic Publication No. H09-503158 disclose that the supercritical fluid such as carbon dioxide and the like can be used as a component of paint, enamel, lacquer, varnish, adhesive agent, pharmaceutical, peeling agent, protection oil, nonaqueous cleaning agent, agricultural coating and the like. However, none of them teaches nor even suggests that the supercritical matter can be used as a reaction vessel or bath 6 in an electrochemical reaction as in the present invention.

As the electrolytic solution, there can be used one obtained by dissolving at least one kind of various electrolytes such as metal salts, organic electrolytes, acids such as phosphoric acid, alkaline matter and the like in a solvent.

The above solvent is not particularly limited as long as it is a polar solvent. As specific examples of the solvent, there can be listed water, alcohols such as ethanol, methanol and the like, cyclic carbonates such as ethylene carbonate, propylene carbonate, straight chain carbonates such as dimethyl carbonate, ethylmethyl carbonate, diethyl carbonate and the like, or a mixed solvent thereof.

The metal salts may properly be selected, taking into consideration the kind of metals, metal alloys, oxides which are to be deposited, and the like. As examples of the metal which can be electrochemically deposited, there can be listed Cu, Zn, Ga, As, Cr, Se, Mn, Fe, Co, Ni, Ag, Cd, In, Sn, Sb, Te, Ru, Rh, Pd, Au, Hg, Tl, Pb, Bi, W, Po, Re, Os, Ir, Pt and the like.

As examples of the organic electrolyte, there can be listed anionic electrolyte such as polyacrylic acid and the like, and cationic electrolyte such as polyethyleneimine and the like. However, the present invention is not limited to those examples.

Besides the above-mentioned matter, the electrolytic solution 1 may contain therein at least one kind of matter for the purpose of stability of the solution. Specifically, there can be listed matter making ion and complex salt of the metal to be deposited, indifferent salt for enhancing the electric conductivity of the electrolytic solution, stabilizer of the electrolytic solution, cushioning material of the electrolytic solution, matter for changing the physical properties of the depositing metal, matter for assisting the dissolving of the cathode, matter for changing the properties of the electrolytic solution or the properties of the depositing metal, stabilizer of mixed solution containing at least two kinds of metal, and the like.

More specifically, examples of the main component of the electrolytic solution in a main electrochemical reaction solution can be listed as under. It should be noted, however, the present invention is not limited to those examples.

a. In the case where copper is to be deposited
   crystallized copper sulfate and sulfuric acid, copper borofluoride and fluoboric acid, copper cyanide and soda cyanide, and copper pyrophosphate, potassium pyrophosphate and ammonia water.
b. In the case where nickel is to be deposited
   nickel sulfate, ammonium chloride and boric acid, nickel sulfate, nickel chloride and boric acid, and nickel sulfamate, nickel chloride and boric acid.
c. In the case where chrome is to be deposited
   chromic acid and sulfuric acid, chromic acid, barium acetate and zinc acetate.
d. In the case where zinc is to be deposited
   zinc acetate, ammonium chloride, ammonium sulfate, boric acid and dextrin, zinc oxide, soda cyanide and caustic soda, (3) zinc oxide and caustic soda.
e. In the case where cadmium is to be deposited
   cadmium oxide, soda cyanide, gelatin and dextrin.
f. In the case where tin is to be deposited
   stannous sulfate, sulfuric acid, cresol sulfonic acid, beta-naphthol and gelatin, potassium stannate and free caustic potassium.
g. In the case where silver is to be deposited
   silver cyanide and potassium cyanide.
h. In the case where gold is to be deposited
   gold, potassium cyanide, potassium carbonate and potassium hydrogen phosphate.
i. In the case where platinum is to be deposited
   chloroplatinic acid, dibasic ammonium phosphate and dibasic soda phosphate, chloroplatinic acid and acetic salt.
j. In the case where rhodium is to be deposited
   concentrated sulfuric acid and rhodium, and phosphoric acid and rhodium phosphate.
k. In the case where ruthenium is to be deposited
   ruthenium complex.
l. In the case where brass is to be deposited
   primary copper cyanide, zinc cyanide, sodium cyanide and sodium carbonate.
m. In the case where tin-lead alloy is to be deposited
   Tin, lead, free fluoboric acid and peptone, tin, lead free fluoboric acid, and peptone, tin, lead, free hydroborofluoric acid and peptone.
n. In the case where iron-nickel alloy is to be deposited
   nickel sulfamate, ferrous sulfamate and sodium acetate.
o. In the case where cobalt phosphorous is to be deposited
   cobalt chloride, phosphorous acid and phosphoric acid.

The stock ratio of the matter 2 to be shifted into a supercritical state and the electrolytic solution 1 in the reaction vessel 6 is not particularly limited but it can properly be set taking into consideration the concentration of the electrolytic solution 1, reacting conditions and the like.

However, if the electrolytic solution 1 is too small, reaction is hardly progressed. Therefore, the electrolytic solution 1 is preferably at least 0.01 wt. % or more with respect to the matter 2 which is equal to or lower than the critical point.

Moreover, the reaction vessel 6 may contain a surface active agent in addition to be matter 2 to be shifted to a supercritical state or the electrolytic solution 1. For example, in the case where carbon dioxide is selected as the matter 1 to be shifted into a supercritical state, the carbon dioxide is nonpolar and hence, incompatible with the electrolytic solution 1. Therefore, when the carbon dioxide is shifted into a supercritical state, the carbon dioxide is usually separated from the solution 1. In order to avoid this, a surface active agent is added thereto so that the system is emulsified and equalized, thereby enhancing the reaction efficiency.

The surface active agent may be at least one kind properly selected from the known group of anionic, nonionic, cationic and ampholytic surface active agents.

As examples of the anionic surface active agent, there can be listed soaps, alpha-olefinsulfonate, alkylbenzene sulfonate, alkyl sulfuric acid ester salt, alkyl ether sulfuric acid ester salt, phenyl ether sulfuric acid ester salt, methyl taurinate, a sulfosuccinate, an ether sulfonate, sulfated oil, phosphoric ester, perfluoro-olefin sulfonate, perfluoro alkylbenzene sulfonate, a perfluoro alkyl sulfuric acid ester salt, a perfluoro alkyl ether sulfuric ether salt, a perfluoro phenyl ether sulfuric ester salt, a perfluoro methyl taurinate, sulfo perfluo succinate, perfluoro ether sulfonate, and the like. It should be noted, however, that the present invention is not limited to those examples.

As examples of a cation of the salt of the above anionic surface active agent, there can be listed sodium, potassium, calcium, tetraethyl ammonium, triethyl methyl ammonium, diethyl dimethyl ammonium, tetramethyl ammonium, and the like. It should be noted, however, that the present invention is not limited to those examples. Instead, any cation can be used as long as it can be electrolyzed.

As examples of a nonionic surface active agent, there can be listed C1–C25 alkylphenol series, C1–C20 alkanol, polyalkylene glycol series, alkylol amide series, C1–C22 fatty acid ester series, C1–C22 aliphatic amine, alkylamine ethylene oxide adduct, aryl alkylphenol, C1–C25 alkylnaphtol, C1–C25 alkoxilated phosphoric acid (salt), solbitan ester, styrenated phenol, alkylamine ethylene oxide/propylene oxide adduct, alkylamine oxide, C1-C25 alkoxilated phosphoric acid (salt), perfluorononyl phenol series, perfluoro higher alcohol series, a perfluoro polyalkylene glycol series, perfluoro alkylol amide series, perfluoro alkyl amine ethylene oxide adduct, perfluoro alkyl amine ethylene oxide/ perfluoro propylene oxide adduct, perfluoro alkyl amine oxide, and the like. It should be noted, however, that the present invention is not limited to those examples.

As examples of the cationic surface active agent, there can be listed a lauryl trimethyl ammonium salt, a stearyl trimethyl ammonium salt, a lauryl dimethyl ethyl ammonium salt, a dimethyl benzyl lauryl ammonium salt, a cetyl dimethyl benzyl ammonium salt, an octadecyl dimethyl benzyl ammonium salt, a trimethyl benzyl ammonium salt, a hexadecyl pyridinium salt, a lauryl pyridinium salt, a dodecylpicolinium salt, stearyl amine acetate, lauryl amine acetate, octadecyl amine acetate, monoalkyl ammonium chloride, dialkyl ammonium chloride, ethylene oxide adduct ammonium chloride, alkyl benzyl ammonium chloride, tetramethyl ammonium chloride, trimethyl phenyl ammonium chloride, tetrabutyl ammonium chloride, monoalkyl ammonium acetate, imida zolinium betaine series, alanine series, alkyl betaine series, monoperfluoro alkyl ammonium chloride, diperfluoro alkyl ammonium chloride, perfluoro ethylene oxide adduct ammonium chloride, perfluoro alkyl benzyl ammonium chloride, tetraperfluoro methyl ammonium chloride, triperfluoro methyl phenyl ammonium chloride, tetraperfluoro butyl ammonium chloride, monoperfluoro alkyl ammonium acetate, perfluoro alkyl betaine series, and the like. It should be noted, however, that the present invention is not limited to those examples.

As examples of an ampholytic surface active agent, there can be listed betaine, sulfobetaine, amine carboxylic acid, and the like. Moreover, there can be listed sulfated or sulfonated adduct of a condensation product of ethylene oxide and/or propylene oxide and alkyl amine or diamine. It should be noted, however, that the present invention is not limited to those examples. The amount of use of the surface active agent is not particularly limited. However, the amount of use is preferably about 0.0001 to 20 wt. % and most preferably about 0.001 to 10 wt. % based on the electrolytic solution.

The reacting conditions in the state shown in FIG. 1(b) can be properly set only except that it is absolutely necessary to execute the reaction under a supercritical state. For example, in the case where carbon dioxide is selected as the matter to be shifted into a supercritical state, it is absolutely necessary to execute the reaction under the conditions of temperature of 304.5 K or higher and pressure of 7.387 MPa or higher because the temperature and pressure just mentioned are the critical points of carbon dioxide, respectively.

Although not particularly limited as long as it is 304.5 K or higher, the reacting temperature for carbon dioxide is preferably from 304.6 K to 573.2 K and most preferably in the range of from 304.5 K to 473.2 K.

Likewise, although not particularly limited as long as it is 7.387 MPa or higher, the reacting pressure for carbon dioxide is preferably in the range of from 7.387 MPa to 40.387 MPa and most preferably in the range of from 7.4 MPa to 20.387 MPa.

The reacting time is different depending on the thickness of the film to be deposited, etc., and not particularly limited. The time is properly set from about 0.001 sec. to about several months in accordance with necessity.

Figure 2:
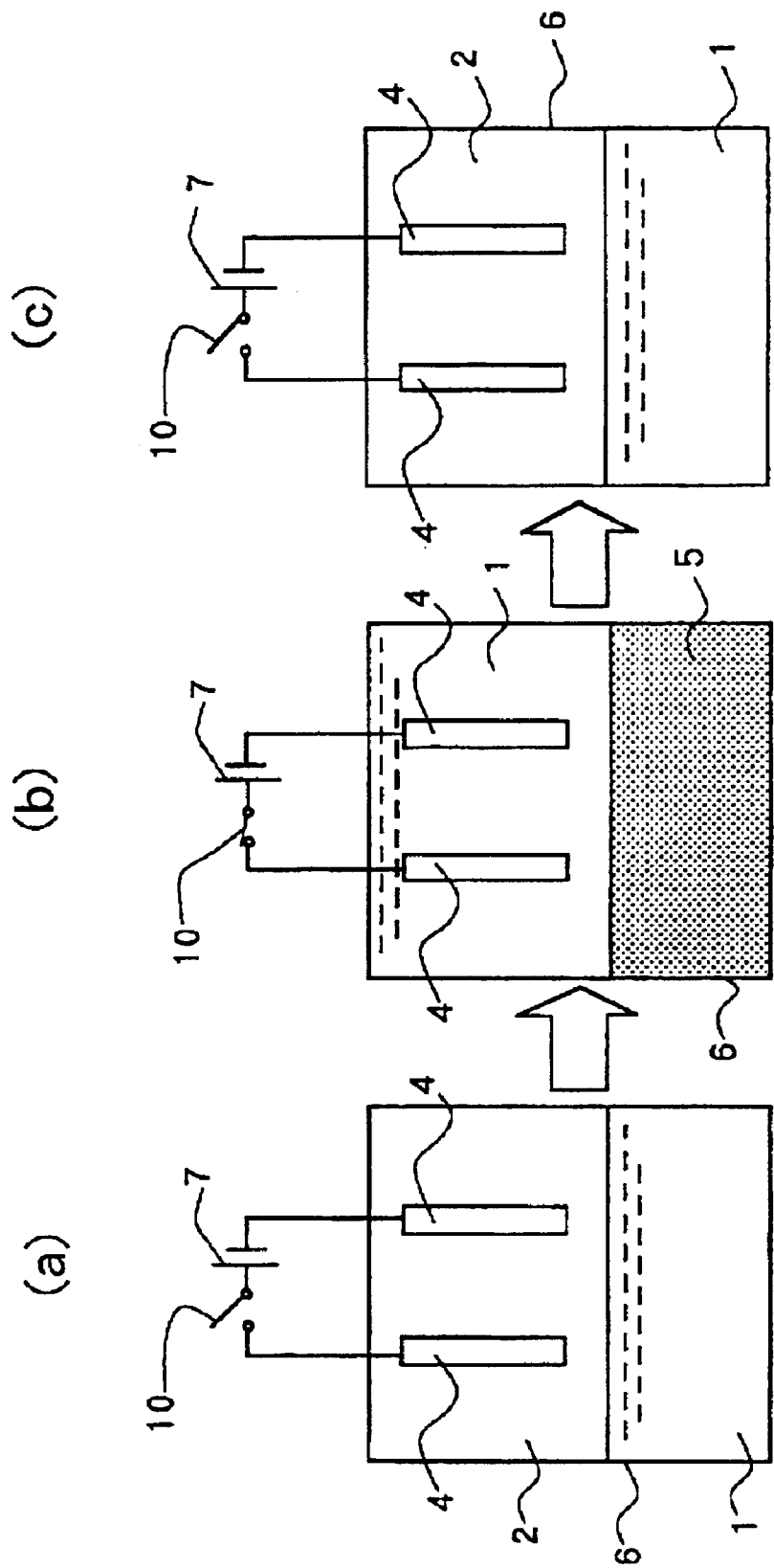
FIG. 2 is an explanatory view for showing the reaction processes according to a second mode for carrying out the present invention in the sequential order of (a), (b) and (c).
Figure 3:
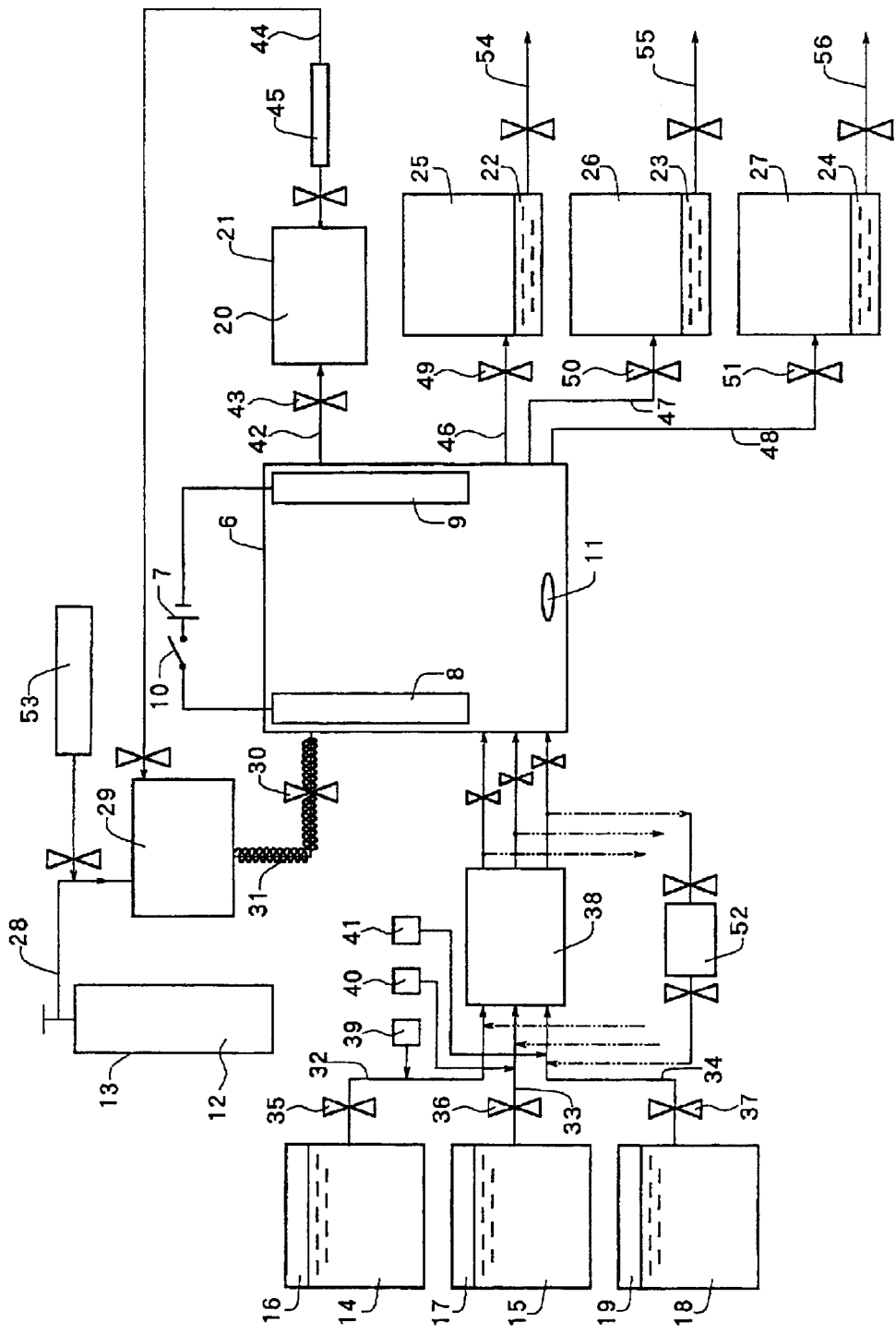
FIG. 3 is an explanatory view of a third mode for carrying out the present invention in which the multi-process of plating treatment is executed using only one reaction vessel.

A second mode for carrying out the present invention will be described next with reference to FIG. 2.

In this second mode, the reaction vessel 6 contains, as in the first mode, the electrolytic solution 1 and the matter 2 in a critical point or lower in the state of FIG. 2(a) which is before reaction. In this second mode, however, when the matter 2 in a critical point or lower is shifted into a matter 5 in a supercritical state by raising the pressure of the system or by other suitable means, a mutually separated state is created as shown in FIG. 2(b).

In the above-mentioned state, the matter 5 in a supercritical state is located at a lower side of the electrolytic solution 1 because the density of the matter 5 is higher than that of the electrolytic solution 1.

In the state of FIG. 2(b), when the electrochemical reaction is executed and the matter 5 is shifted back into an initial state which is equal to or lower than a critical point after reaction, the matter 5 in a supercritical state is moved to the upper layer while being abruptly evaporated or liquefied. Accordingly, a flow is generated to the system as in the first mode and the surface of each electrode 4 is cleaned.

The composition of each component contained in the reaction vessel 6, the reacting conditions, etc. are based on those of the first mode.

The present invention will now be described in detail with reference to specific examples and comparative examples. It should be noted, however, the present invention is not limited to those examples. Instead, the composition, concentration of the matter to be shifted into a supercritical state, the electrolytic solution and the surface active agent, as well as the reacting conditions of electric current, etc. can be changed, where appropriate, without departing from the scope of the appended claims.

SPECIFIC EXAMPLE 1

A pure nickel plate was used for the anode electrode and a Hull cell test-use brass plate was used for the cathode electrode, and electroplating was carried out. A nickel Watt bath was used as the electrolytic solution. Its composition is shown hereunder.
[Plating Bath Composition]

| | |
|---|---|
| nickel sulfate: | 330 g/l |
| nickel chloride: | 80 g/l |
| boric acid: | 50 g/l |
| brightener: | 0.45 g/l |
| pH: | 4.3 |

As the surface active agent, block polymer (PEO-PBO, molecular weight=860–b–660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 10 minutes under the conditions of temperature of 50 degrees C. (323 K), pressure of 15 MPa and electric current density of 2 A/dm. As a result, a uniform nickel film was formed on the surface of the cathode electrode with a good power of adhesion. The deposition thickness at the central part of the obtained film was 8.0 μm. When this was compared with the comparative example 1 (later described) as a conventional method, remarkable improvement was observed both in deposition speed and in deposition efficiency.

After the completion of reaction, the carbon dioxide was evaporated by reducing the pressure and the electrodes were cleaned. About the same cleaning effect was obtained as in the conventional case where rinsing was carried out twice in stored water of 500 ml and cleaning was conducted in running water for three minutes.

COMPARATIVE EXAMPLE 1

As in the specific example 1, pure nickel plate was used for the anode electrode and a Hull cell test-use brass plate was used for the cathode electrode, and electroplating was carried out. A nickel Watt bath was used as the electrolytic solution. Its composition is shown hereunder.
[Plating Bath Composition]

| | |
|---|---|
| nickel sulfate: | 330 g/l |
| nickel chloride: | 80 g/l |
| boric acid: | 50 g/l |

-continued

| | |
|---|---|
| brightener: | 0.45 g/l |
| pH: | 4.3 |

Reaction was carried out for 10 minutes under the conditions of temperature of 50 degrees C. and electric current density of 2 A/dm. As a result, a nickel film was formed on the surface of the cathode electrode with a good power of adhesion. The deposition thickness at the central part of the obtained film was 5.6 μm.

SPECIFIC EXAMPLE 2

A pure copper plate was used for the anode electrode and a Hull cell test-use brass plate was used for the cathode electrode, and electroplating was carried out. A copper cyanide bath was used as the electrolytic solution. Its composition is shown hereunder.
[Plating Bath Composition]

| | |
|---|---|
| primary copper cyanide: | 30 g/l |
| sodium cyanide: | 45 g/l |
| (free sodium cyanide): | 15 g/l |
| sodium carbonate: | 15 g/l |
| pH: | 12.5 |

As the surface active agent, block polymer (PEO-PBO, molecular weight=860-b-660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 10 minutes under the conditions of temperature of 50 degrees C. (323 K), pressure of 15 MPa and electric current density of 5 A/dm.

As a result, a uniform copper film was formed on the surface of the cathode electrode with a good power of adhesion. The deposition thickness at the central part of the obtained film was 10.8 μm. When this was compared with the comparative example 2 (later described) as a conventional method, remarkable improvement was observed both in deposition speed and in deposition efficiency.

COMPARATIVE EXAMPLE 2

As in the specific example 2, a pure copper plate was used for the anode electrode and a Hull cell test-use brass plate was used for the cathode electrode, and electroplating was carried out. A copper cyanide bath was used as the electrolytic solution. Its composition is shown hereunder.
[Plating Bath Composition]

| | |
|---|---|
| primary copper cyanide: | 30 g/l |
| sodium cyanide: | 45 g/l |
| (free sodium cyanide): | 15 g/l |
| sodium carbonate: | 15 g/l |
| pH: | 12.5 |

Reaction was carried out for 10 minutes under the conditions of temperature of 50 degrees C., and electric current density of 5 A/dm. As a result, a uniform copper film was formed on the surface of the cathode electrode with a good power of adhesion. The deposition thickness at the central part of the obtained film was 8.3 μm.

SPECIFIC EXAMPLE 3

A zinc plate was used for the anode electrode and a Hull cell test-use brass plate was used for the cathode electrode, and electroplating was carried out. A zincate bath was used as the electrolytic solution. Its composition is shown hereunder.
[Plating Bath Composition]

| | |
|---|---|
| zinc oxide: | 40 g/l |
| sodium hydroxide: | 180 g/l |
| pH: | 5.1 |

As the surface active agent, block polymer (PEO-PBO, molecular weight=860-b-660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 10 minutes under the conditions of temperature of 50 degrees C. (323 K), pressure of 15 MPa and electric current density of 5 A/dm. As a result, a uniform zinc film was formed on the surface of the cathode electrode with a good power of adhesion. The deposition thickness at the central part of the obtained film was 13.1 μm. When this was compared with the comparative example 3 (later described) as a conventional method, remarkable improvement was observed both in deposition speed and in deposition efficiency.

COMPARATIVE EXAMPLE 3

As in the specific example 3, (Specific Example 3), a zinc plate was used for the anode electrode and a Hull cell test-use brass plate was used for the cathode electrode, and electroplating was carried out. A zincate bath was used as the electrolytic solution. Its composition is shown hereunder.
[Plating Bath Composition]

| | |
|---|---|
| zinc oxide: | 40 g/l |
| sodium hydroxide: | 180 g/l |
| pH: | 5.1 |

Reaction was carried out for 10 minutes under the conditions of temperature of 50 degrees C. and electric current density of 5 A/dm. As a result, a uniform zinc film was formed on the surface of the cathode electrode with a good power of adhesion. The deposition thickness at the central part of the obtained film was 8.9 μm.

SPECIFIC EXAMPLE 4

A copper plate was used for the anode electrode and a Hull cell test-use brass plate was used for the cathode electrode, and electroforming was carried out. A copper sulfate bath was used as the electrolytic solution. Its composition is shown hereunder.

[Copper Sulfate Bath]

| | |
|---|---|
| copper sulfate: | 200 g/l |
| phosphoric acid: | 60 g/l |
| hydrochloric acid: | 30 mg/l |
| pH: | 4.5 |

As the surface active agent, block polymer (PEO-PBO, molecular weight=860–b–660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 10 minutes under the conditions of temperature of 50 degrees C. (323 K), pressure of 15 MPa and electric current density of 20 A/dm.

As a result, a uniform electroformed copper film was formed on the surface of the cathode electrode with a good power of adhesion. The deposition thickness at the central part of the obtained film was 40 μm.

SPECIFIC EXAMPLE 5

An aluminum plate was used for the anode electrode and a Hull cell test-use brass plate was used for the cathode electrode, and anodic oxidation treatment was carried out. A sulfuric acid bath was used as the electrolytic solution. Its composition is shown hereunder.
[Sulfuric Acid Bath]

| | |
|---|---|
| copper sulfate: | 200 g/l |

As the surface active agent, block polymer (PEO-PBO, molecular weight=860–b–660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 30 minutes under the conditions of temperature of 15 degrees C. (288 K), pressure of 15 MPa and electric current density of 2 A/dm.

As a result, a uniform oxide film was formed on the surface of the anode electrode.

SPECIFIC EXAMPLE 6

A stainless plate was used for the anode electrode and a carbonate plate was used for the cathode electrode, and electrochemical polishing was carried out. A sulfuric acid bath was used as the electrolytic solution. Its composition is shown hereunder.
[Sulfuric Acid Bath]

| | |
|---|---|
| sulfuric acid: | 300 g/l |
| phosphoric acid: | 600 g/l |
| chromic acid: | 50 g/l |

As the surface active agent, block polymer (PEO-PBO, molecular weight=860–b–660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 10 minutes under the conditions of temperature of 60 degrees C. (333 K), pressure of 15 MPa and electric current density of 500 A/dm.

As a result, a smooth and flat, bright polished-surface was formed on the surface of the anode electrode.

SPECIFIC EXAMPLE 7

A copper plate was used for the anode electrode and a chrome plate having a thickness of 4 mm was used for the cathode electrode, and electrochemical machining was carried out. A sodium chloride aqueous solution was used as the electrolytic solution. Its composition is shown hereunder.
[Solution Composition]

| | |
|---|---|
| sodium chloride: | 200 g/l |

As the surface active agent, block polymer (PEO-PBO, molecular weight=860–b–660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 20 minutes under the conditions of temperature of 50 degrees C. (323 K), pressure of 15 MPa and electric current density of 100 A/dm.

As a result, the surface of the cathode electrode was sufficiently etched and the thickness at the central area was reduced by 550 μm.

SPECIFIC EXAMPLE 8

A SUS304 plate was used for the anode electrode and an iron plate was used for the cathode electrode, and electrophoretic coating was carried out. A Powertop (Trademark) U-30 series (pH 6.5), product of Nippon Paint, was used as the electrolytic solution.

As the surface active agent, block polymer (PEO-PBO, molecular weight=860–b–660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 15 seconds under the conditions of temperature of 50 degrees C. (323 K), pressure of 15 MPa and electric current density of 20 A/dm.

As a result, the surface of the cathode electrode was uniformly coated with a good adhesion power. The deposition thickness at the central part of the obtained film was 22 μm.

SPECIFIC EXAMPLE 9

A pure copper plate was used for the anode electrode and a Hull cell test-use brass plate was used for the cathode electrode, and electrorefining was carried out. A copper sulfate bath was used as the electrolytic solution. Its composition is shown hereunder.
[Copper Sulfate Bath]

| | | |
|---|---|---|
| copper sulfate: | 200 | g/l |
| sulfuric acid: | 60 | g/l |
| hydrochloric acid: | 30 | mg/l |
| pH: | 4.5 | |

As the surface active agent, block polymer (PEO-PBO, molecular weight=860–b–660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 10 minutes under the conditions of temperature of 50 degrees C. (323 K), pressure of 15 MPa and electric current density of 20 A/dm.

As a result, a uniform pure copper having a high degree of purity was deposited on the surface of the cathode electrode. The deposition thickness at the central part of the obtained pure copper was 40 μm.

SPECIFIC EXAMPLE 10

An iron steel was used as the material and chemical conversion treatment was carried out through Parkerizing method. The solution composition is shown hereunder.
[Solution Composition]

| | |
|---|---|
| phosphoric acid: | 25 g/l |
| manganese dioxide: | 1.5 g/l |

As the surface active agent, block polymer (PEO-PBO, molecular weight=860–b–660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 60 minutes under the conditions of temperature of 100 degrees C. (378 K) and pressure of 15 MPa.

As a result, a uniform phosphoric acid iron film was formed on the surface of the material.

SPECIFIC EXAMPLE 11

A zinc plated-iron was used as the material and chromate treatment method as one variety of chemical conversion treatment was carried out. The solution composition is shown hereunder.
[Solution Composition]

| | |
|---|---|
| sodium dichromate | 10 g/l |
| sulfuric acid | 0.5 ml/l |
| nitric acid | 3 ml/l |
| acetic acid | 1.5 ml/l |

As the surface active agent, block polymer (PEO-PBO, molecular weight=860–b–660 g/mol) of polybutyleneoxide-polyethyleneoxide was added by 1.5 wt % based on the above electrolytic solution.

Carbon dioxide was used as the matter to be shifted into a supercritical state, and the volume ratio of the electrolytic solution and the carbon dioxide was set to ½ under the normal pressure. Reaction was carried out for 15 seconds under the conditions of temperature of 32 degrees C. (305 K) and pressure of 15 MPa.

As a result, a uniform chromate film was formed on the surface of the material.

SPECIFIC EXAMPLE 12

A Hull cell test-use brass plate was used as the material and electroless plating was carried out. The composition of the plating bath is shown hereunder.
[Plating Bath Composition]

| | |
|---|---|
| nickel sulfate | 21 g/l |
| sodium hypophosphite | 60 g/l |
| ludic acid | 25 g/l |
| propionic acid | 3 g/l |
| stabilizer (lead) | 3 mg/l |
| pH | 4.5 |

As the surface active agent, block polymer (PEO-PBO, molecular weight=860–b–660 g/mol) of polybutyleneoxide-polyethyleneoxide was added by 1.5 wt % based on the above electrolytic solution.

Carbon dioxide was used as the matter to be shifted into a w supercritical state, and the volume ratio of the electrolytic solution and the carbon dioxide was set to ½ under the normal pressure. Reaction was carried out for 10 minutes under the conditions of temperature of 90 degrees C. (363 K) and pressure of 15 MPa.

As a result, a uniform nickel phosphoric film was formed on the surface of the material with a good power of adhesion. The deposition thickness at the central part of the obtained film was 4 μm.

FIGS. 3 to 10 show a third mode in which the present invention is applied to electroplating (nickel plating).

In this third mode, reference numeral 6 denotes a plating vessel as an electrochemical reaction vessel, which plating vessel is made of stainless steel. The inner surface of the plating vessel is lined with a vinyl chloride or hard rubber. A cover member (not shown) is removably attached air-tight to an upper opening portion of the plating vessel.

A direct current power source 7 as an external electric field is disposed at the outside of the plating vessel 6. An anode electrode 8 as an electrode matter, which is conducted to the plus electrode side and a cathode electrode 9 as an electrode matter, this being the matter to be treated, too and conducted to the minus electrode side, are disposed such that they can be received in the plating vessel 6.

In this third mode, a pure nickel plate is used for the anode electrode 8 and a Hull cell test-use brass plate is used for the cathode electrode 9. In FIGS. 3–10, reference numeral 10 denotes a switch inserted into a power feed circuit of the direct current power source 7. This switch 10 is turned on only at the time of electrochemical reaction, i.e., only at the time of electroplating, so that power can be supplied to the anode electrode 8 and the cathode electrode 9. Reference numeral 11 denotes an agitator such as a stirrer which is disposed at a bottom portion of the plating vessel 6. An electrolytic solution or acid solution containing carbon dioxide as later described, which is a supercritical matter introduced into the plating vessel 6 and a surface active agent, can be stirred by the agitator.

At the outside of the plating vessel 6, there are disposed a gas tank 13 containing therein a pressurized carbon dioxide 12 as a supercritical matter, electrolytic solution vessels 16, 17 containing therein mutually different kind of electrolytic solutions 14, 15 respectively, and an acid solution vessel 19 containing therein an acid solution 18 equal to PH 7 or lower.

Moreover, at the outside of the plating vessel 6, there are disposed a gas reservoir vessel 21 for reserving therein used carbon dioxide 20 and a solution reservoir vessels 25–27 for reserving therein used acid solution 22 containing therein a surface active agent or used electrolytic solutions 23, 24 each containing therein an active surface agent.

Those solution reservoir vessels 25 to 27 are connected with return pipes 54 to 56 communicated with the solution vessels, 16, 17, 19, respectively. Through those return pipes 54 to 56, the used solutions 22 to 24 are refluxed to the solution vessels 14, 15, 18, respectively, after the used solutions 22 to 24 are reproduced by being slightly adjusted to a high concentration level only after the used solutions 22 to 24 are separated from the surface active agent or without being separated from the surface active agent.

The gas tank 13 is in communication with an upper part of the plating vessel 6 through a conduit 23. A compression pump 29 and a valve 30 are interposingly installed in the conduit 28. The compression pump 29 is designed such that the carbon dioxide 7 can be compressed to a predetermined pressure level. In this third mode for carrying out the present invention, the carbon dioxide 12 is compressed to a level of 10.0 MPa which is higher than its critical point 7.38 MPa.

It is also accepted that the carbon dioxide 12 is compressed into a subcritical state instead of a supercritical state, and then the succeeding treatment is carried out.

The valve 25 is opened for a predetermined time before each treatment process of plating operation, namely, degreasing treatment, oxygen film removing treatment or so-called acid picking treatment, plating treatment and drying treatment, and at the time of cleaning the cathode electrode 9 which is executed between every two treatment processes mentioned above, so that the carbon dioxide 12 in a supercritical state can be introduced into the plating vessel 6.

A heating means 31 such as a heater is disposed on the downstream side of the conduit 28. This heating means 31 is adapted to heat the carbon dioxide 12 to its critical temperature of 31.3 degrees C. or higher.

The respective vessels 16 to 18 are in communication with the a lower part of the plating vessel 6 through the conduits 32 to 34, respectively. Valves 35 to 37 and a common fluid feed pump 38 are interposingly installed in the conduits 32 to 34. Of those valves, the valves 35, 36 are opened for a predetermined time before plating treatment so that the electrolytic solutions 14, 15 containing therein a prescribed surface active agent can be introduced into the plating vessel 6 through the liquid feed pump 38.

The valve 37 is opened for a predetermined time before acid picking treatment so that the acid solution 18 containing therein a prescribed surface active agent can be introduced into the plating vessel 6 through the liquid feed pump 38.

In those Figures, reference numeral 39 to 41 denote surface active agents which are to be added to the electrolytic solutions 14, 15 and the acid solution 18. Those surface active agents 39 to 41 can be introduced through the proper pumps (not shown) at the time of supplying the solutions 14, 15, 18.

The gas reservoir vessel 20 is in communication with an upper part of the plating vessel 6 through a conduit 42. A valve 43 is interposingly installed in the conduit 42. This valve 43 is opened for a predetermined time before each treatment of the degreasing treatment, acid picking treatment, plating treatment and drying treatment, and before cleaning treatment of the matter 9 to be treated which is executed between every two treatments.

In the Figures, reference numeral 44 denotes a return pipe one end of which is connected to the gas reservoir vessel 20. The other end of the return pipe 44 is connected to the compression pump 29. A column 45 capable of absorbing water and a fat and oil component is inserted in the return pipe 44.

Owing to the above arrangement, when a predetermined amount of carbon dioxide 20 is reserved in the gas reservoir vessel 20, it becomes possible that the carbon dioxide 20 is introduced into the column 45 and reproduced into its original state, and the reproduced carbon dioxide 20 is refluxed to the compression pump 29.

The solution reservoir vessels 25 to 27 are in communication with a lower part of the plating vessel 6 through conduits 46 to 48, respectively. Valves 49 to 51 are interposingly installed in the conduits 46 to 48, respectively. Of those valves, the valve 49 is open for a predetermined time after acid picking treatment of the cathode electrode 9, so that the used acid picking solution 22 can be introduced into the solution reservoir vessel 25 together with the surface active agent 41.

The valves 50, 51 are open for a predetermined time after the respective plating treatments, so that the used electrolytic solutions 23, 24 can be introduced into the solution reservoir vessels 26, 27, respectively, together with the surface active agents 39, 40.

Similarly, reference numeral 52 denotes a cleaning water-tank which is interposingly installed in parallel relation in the liquid feed pump 38 and the conduits 32 to 34. After the solutions 14, 15, 18 are transferred to the plating vessel 6, the inside of the pump 38 can be cleaned.

Reference numeral 53 denotes an entrainer composed of an organic solvent such as alcohol. The entrainer 53 is selectively introduced into the conduit 28 between the gas tank 13 and the compression pump 29 so that stubborn fat and oil component can be degreased.

In the electrochemical reaction apparatus of electroplating, etc. thus constructed, since multi-process such as, preceding treatment of the plating treatment, namely, degreasing treatment, acid picking treatment and cleaning treatment, plating treatment, the succeeding treatment of the plating treatment, namely, recollecting treatment of the matter 9 to be treated and drying treatment, can be executed in only one plating vessel 6, the constitution is simplified and the installation space is made compacted compared with the conventional plating treatment method in which an exclusive-use vessel is required for each treatment. Thus, the equipment cost can be lowered.

Moreover, in the present invented apparatus, various discharges, namely, the acid picking solution and electrolytic solution containing carbon dioxide and surface active agent, which are discharged during the various processes such as degreasing treatment, acid picking treatment, cleaning treatment, plating treatment and drying treatment, are discharged into the gas reservoir vessel 21 and the plural solution storage vessels 25 to 27, thus avoiding the discharge thereof to outside. Moreover, the various discharges temporarily discharged into the gas reservoir vessel 21, etc. are processed rationally. Accordingly, an expensive and large-sized liquid waste processing equipment, which was conventionally required, is no more required.

Moreover, since the above-mentioned various treatments are executed using supercritical carbon dioxide which has a very good diffusability, only a small amount of acid solution and electrolytic solution is good enough compared with the conventional plating method in which the matter to be treated is immersed in a plating solution. Accordingly, the consumption of those solutions can be reduced and the discharging treatment equipment can be designed small in size and light in weight.

Moreover, since each treatment is executed using supercritical carbon dioxide and the consumption of solution and water is suppressed as much as possible, the liquid waste treatment equipment can be simplified, and the matter to be treated can be cleaned, recollected and dried easily and rapidly and the electrolytic solution can be recollected easily and rapidly.

Since the present invented apparatus uses carbon dioxide having a comparatively low critical point in temperature and pressure as supercritical matter, a supercritical state can be obtained with a comparatively small amount of energy and easily and rapidly. Moreover, the cost for using such supercritical matter can be reduced and the pressure resisting strength of the plating vessel 1 can be eased, thus enabling to make the plating vessel at a low cost.

In the case where electroplating is executed using such an electrochemical reaction apparatus, first, the matter 9 to be treated, which was subjected to, for example, surface polishing treatment, is attached to the minus pole side of the plating vessel 6 under the condition that the supply of electric current to the electrodes 8, 9 is stopped and then, the cover member (not shown) is brought into a closed position to hermetically close the plating vessel 6.

Then, the compression pump 29 is actuated to operate the heating means 31 to open the gas tank 13, and the carbon dioxide 12 stored in the tank 13 is introduced into the compression pump 29 where the carbon dioxide 12 is raised in pressure to such a high level as equal to or higher than its critical point. Then, the pressure increased-carbon dioxide 12 is heated to a level equal to or higher than its critical point by the heating means 31, thereby producing a supercritical carbon dioxide. Then, the valve 30 is opened to allow the supercritical carbon dioxide to be introduced into the plating vessel 6.

The supercritical carbon dioxide is diffused in the plating vessel 6 at a high speed. As a result, the carbon dioxide in the plating vessel 6 is also shifted into a supercritical state and contacted with the matter 9 to be treated, thereby cleaning the fat and oil component, moisture, foreign matter, etc. adhered to the matter 9 and the anode electrode 8 at a high speed and efficiently.

At that time, the agitator 11 is operated to agitate the supercritical carbon dioxide. By doing so, the diffusion of the supercritical carbon dioxide is uniformly made and the cleaning performance is enhanced.

Moreover, since the use of water and solution as in the conventional emulsion cleaning is eliminated, the drying performance with respect to the matter 9 to be treated is accelerated to that extent.

According to the present invention, the matter 9 to be treated is degreased and cleaned under a supercritical state as discussed. Accordingly, a need of use of a hazardous degreasing agent can be eliminated and the working environment can be improved compared with the conventional method in which the matter to be treated is immersed in a degreasing solution. Hence, the degreasing and cleaning treatment can be executed safely and rapidly. Moreover, since the degreasing and cleaning treatment is executed in the plating vessel 6, exclusive-use degreasing vessels, which are required in the conventional method, are no more required. Hence, the equipment cost can be reduced to that extent.

Then, after the cleaning treatment is executed for a predetermined time, the valve 43 is opened and the valve 30 is closed to stop the operation of the compression pump 29.

Figure 4:
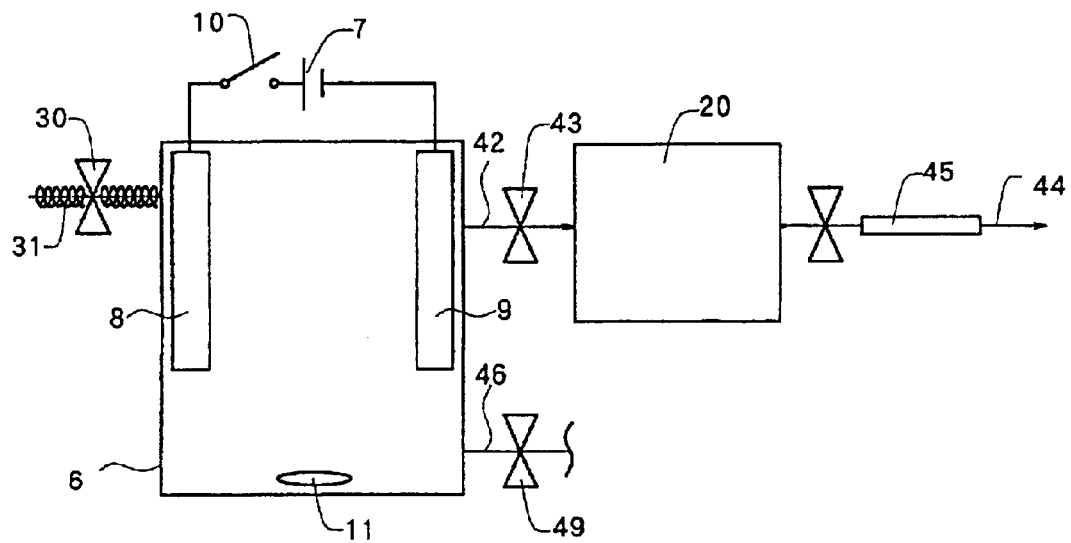
FIG. 4 is an explanatory view showing the degreasing and cleaning processes of the plating treatment in the third embodiment.
Figure 5:
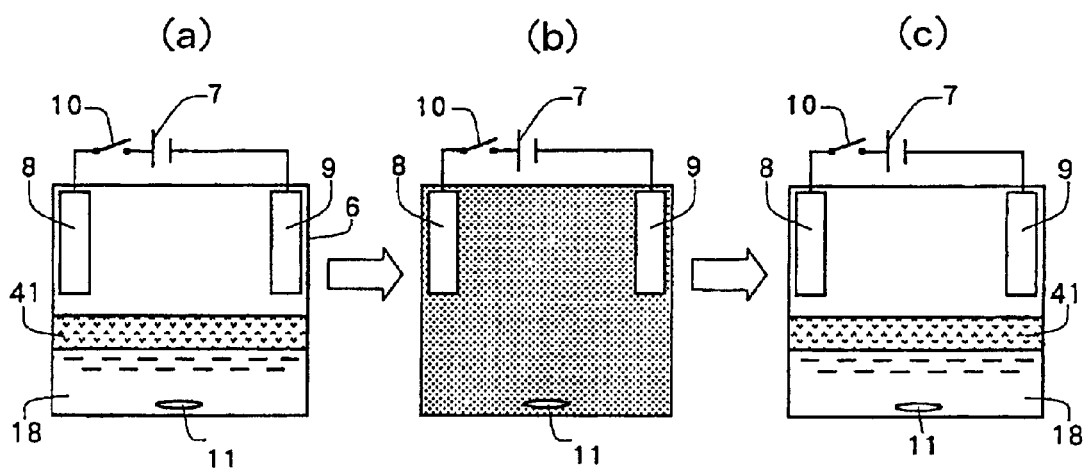
FIG. 5 is an explanatory view showing the processes for removing an oxide film resulting from the plating treatment and activating the matter to be treated, both in the third embodiment, in the sequential order of (a), (b) and (c).

By doing so, the carbon dioxide is reduced in pressure and shifted into a state equal to or lower than its critical point. Accordingly, the carbon dioxide is abruptly evaporated or liquefied and moved upward within the plating vessel 6. Then, the carbon dioxide is moved into the gas reservoir vessel 21 through the conduit 42. This state is as shown in FIG. 4.

Accordingly, the fat and oil component, moisture, foreign matter, etc. caught by the carbon dioxide are moved into the gas reservoir vessel 21, and a flow is generated in the system at the time of movement of the carbon dioxide, so that the anode electrode 8 and the matter 9 to be treated are cleaned. This cleaning treatment, in cooperation with the above-mentioned cleaning treatment, improves the cleaning precision. After the used carbon dioxide 20 is discharged into the gas reservoir vessel 21, the valve 43 is closed.

After the cleaning treatment is executed, the matter 9 to be treated is subjected to acid picking treatment. At the time of this acid picking treatment, the valve 37 is opened under the conditions that the supply of electric current is stopped and the plating vessel 6 is held in a hermetically closed state, and the acid solution 18 contained in the acid solution vessel 19 is sent into the liquid feed pump 38. At the same time, the prescribed surface active agent 41 is added to the acid solution 18 and then sent into the plating vessel 6.

As shown in FIG. 5(a), the acid solution 18 and the surface active agent 41 form two layers within the plating vessel 6. In that state, the compression pump 29 is actuated to operate the heating means 31 to open the gas tank 13, and the carbon dioxide stored in the tank 13 is introduced into the compression pump 29 where the carbon dioxide is raised in pressure to such a high level as equal to or higher than its critical point. Then, the pressure increased-carbon dioxide is heated to a level equal to or higher than its critical point by the heating means 31, thereby producing a supercritical carbon dioxide. Then, the valve 30 is opened to allow the supercritical carbon dioxide to be introduced into the plating vessel 6.

The supercritical carbon dioxide introduced into the plating vessel 6 is diffused at a high speed within the plating vessel 6 and mixed with the acid solution 18 and the surface active agent 41 rapidly and emulsified. Its fine particles are contacted with the surface of the matter 9 to be treated to take off the rust thereon and remove the oxide film so that the surface of the matter 9 to be treated is activated.

This state is as shown in FIG. 5(b). At that time, the agitator 11 is operated to agitate the emulsified matter. By doing so, the diffusion is uniformly made, the oxide film is removed uniformly and efficiently, and the acid picking performance is enhanced.

When the valve 49 is opened after the acid picking treatment is executed for a predetermined time, the critical carbon dioxide is reduced in pressure and shifted into a state equal to or lower than its critical point. As a result, the state of two layers of the used acid solution 18 and surface active agent 41 is recovered within the plating vessel 6. This state is as shown in FIG. 5(c).

In the meantime, carbon oxide of high pressure is introduced into the plating vessel 6 from the valve 30, and the used acid solution 18 and the surface active agent 41 are pushed out by this pressure and moved into the solution reservoir vessel 25 through the conduit 46 and reserved therein. This state is as shown in FIG. 4.

According to the present invention, the oxide film d the matter 9 to be treated is removed under a supercritical state as discussed. Accordingly, the amount of the acid solution to be used can be reduced compared with the conventional acid picking method in which the matter to be treated is immersed in an acid solution. Hence, the acid film removing treatment can be executed rapidly and easily. Moreover, since the acid picking treatment is executed in the plating vessel 6, exclusive-use acid picking vessels, which are required in the conventional method, are no more required. Hence, the equipment cost can be reduced to that extent.

After the discharging operation of the acid solution 22 is finished, the valve 49 is closed and a valve 53 is opened, so that the used carbon dioxide within the plating vessel 6 is pushed out by the introduced carbon dioxide into the gas reservoir vessel 20 through the conduit 42 and reserved therein.

Figure 6:
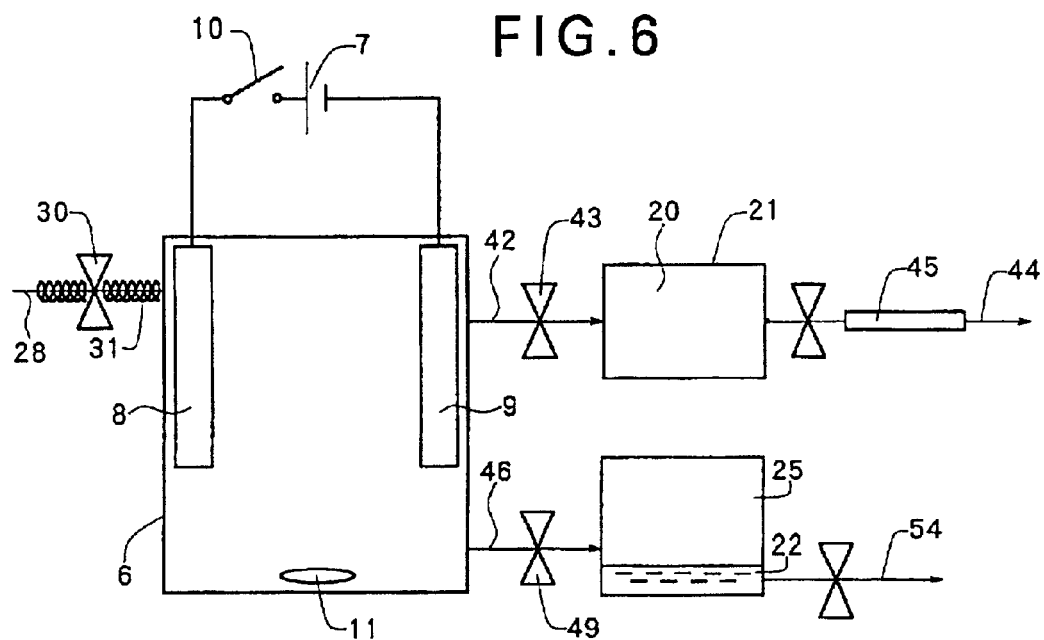
FIG. 6 is an explanatory view showing the discharging and cleaning processes for discharging the oxide solution resulting from the plating treatment in the third embodiment.

At that time, a flow is generated in the system at the time of movement of the carbon dioxide, and the anode electrode 8 and the matter 9 to be treated are cleaned. This state is as shown in FIG. 6.

The order of discharge of the acid solution 17 and the carbon dioxide may be reversed. However, if they are discharged in the order mentioned previously, they can be discharged efficiently and with precision.

After the used carbon dioxide is discharged, the valve 43 is closed and the carbon dioxide 12 of high pressure is introduced into the plating vessel 6 for a predetermined time.

By doing so, the inside of the plating vessel 6 is increased in pressure and temperature, and the carbon dioxide is shifted into a critical state. This supercritical carbon dioxide is contacted with the matter 9 to be treated, so that the moisture adhered to the matter 9 to be treated and the anode electrode 8 is cleaned and dried at a high speed and efficiently.

At that time, the agitator 11 is operated to agitate the supercritical carbon dioxide. By doing so, the diffusion is accelerated and the cleaning performance is enhanced.

After the matter 9 to be treated is cleaned and dried, the compression pump 29 is stopped and the valve 30 is closed to stop the introduction of the carbon dioxide, and the valve 43 is opened, so that the used carbon dioxide within the plating vessel 6 is introduced into the conduit 42 and sent into the gas reservoir vessel 20 through the conduit 42 and reserved therein.

At that time, a flow is generated in the system at the time of movement of the carbon dioxide, and the anode electrode 8 and the matter 9 to be treated are cleaned. This state is as shown in FIG. 6.

According, the matter 9 to be finished, which was subjected to the various preceding treatments and dried, is placed within the plating vessel 6.

In that state, one of the valves 35, 36, the valve 36 in this example, is opened to send the electrolytic solution 14 contained in the electrolytic solution vessel 16 to the liquid feed pump 38. At the same time, a prescribed surface active agent 39 is added to the solution 14 and sent into the plating vessel 6.

Figure 7:
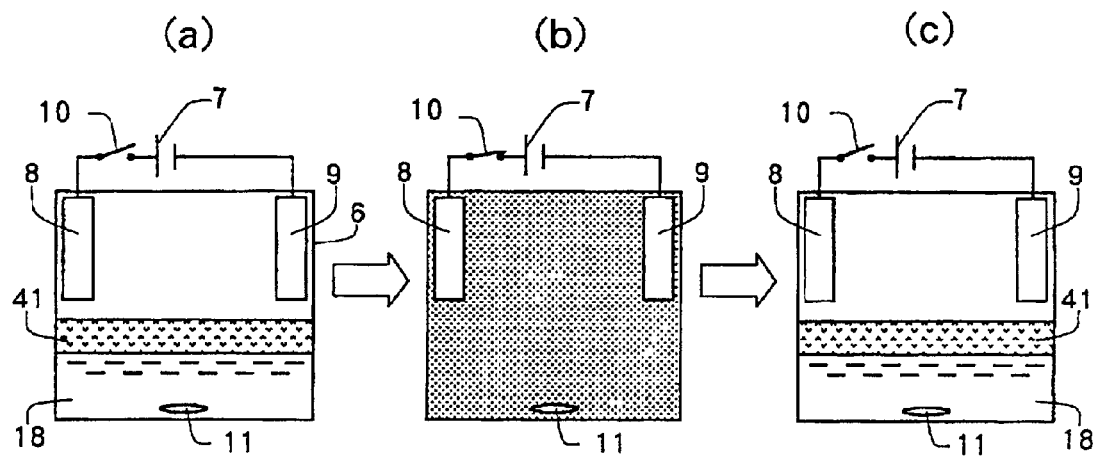
FIG. 7 is an explanatory view showing the plating process of the plating treatment in the third embodiment in the sequential order of (a), (b) and (c).
Figure 8:
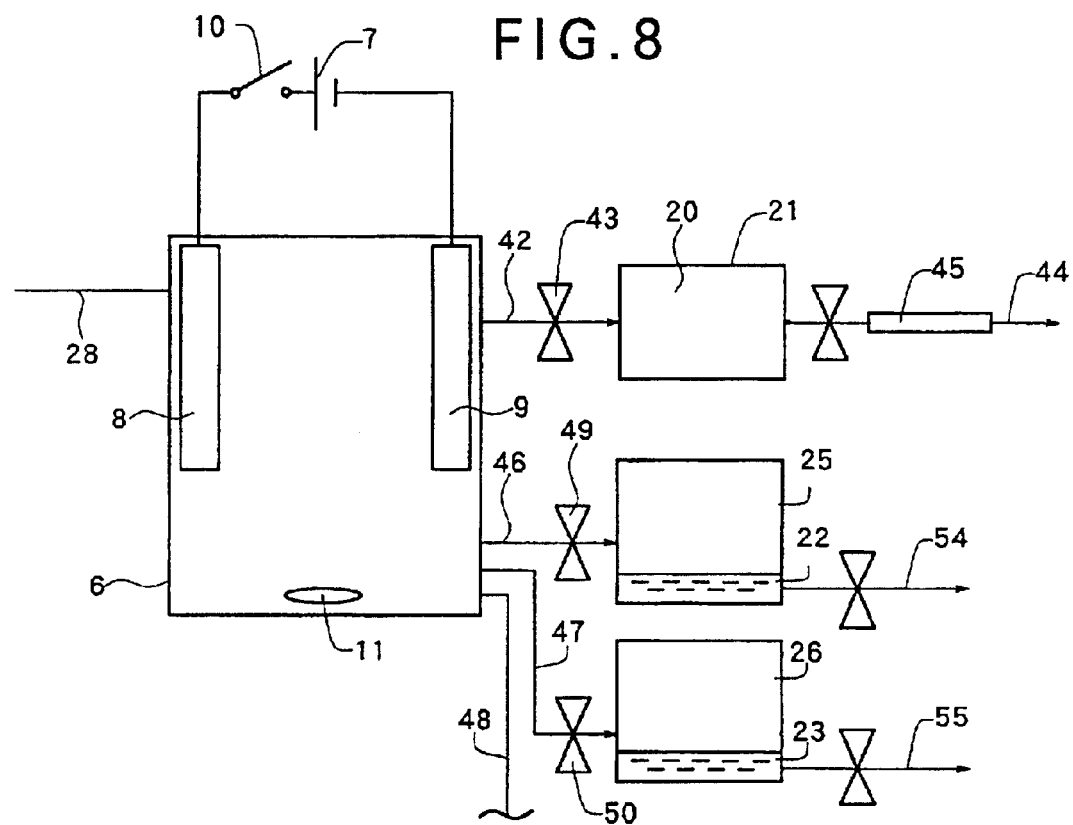
FIG. 8 is an explanatory view showing the discharging and cleaning processes for discharging the electrolytic solution resulting from the plating treatment in the third embodiment.
Figure 9:
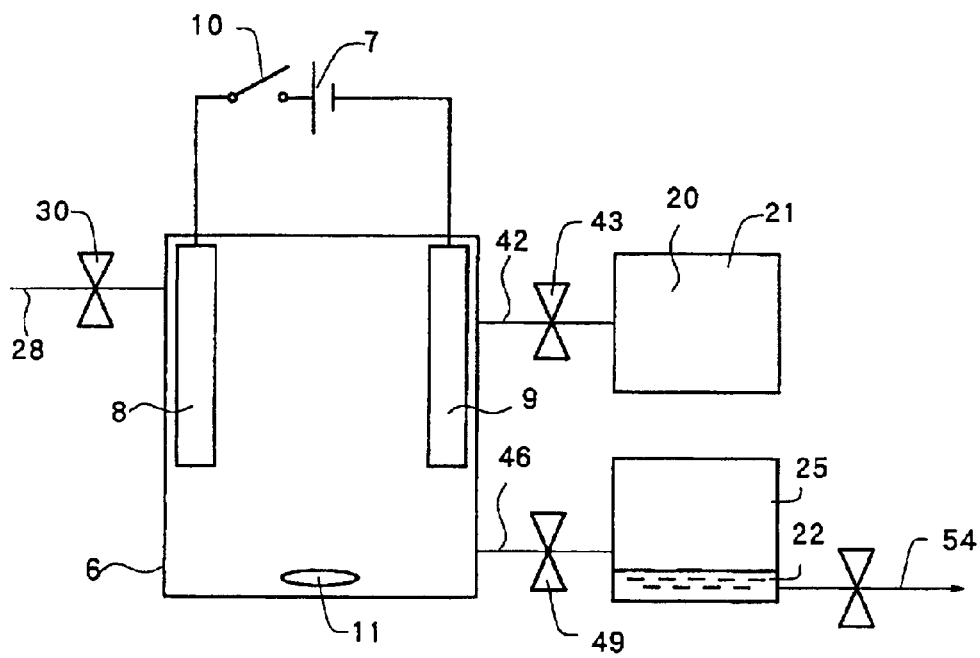
FIG. 9 is an explanatory view showing the processes for drying and cleaning the plating treatment in the third embodiment.
Figure 11:
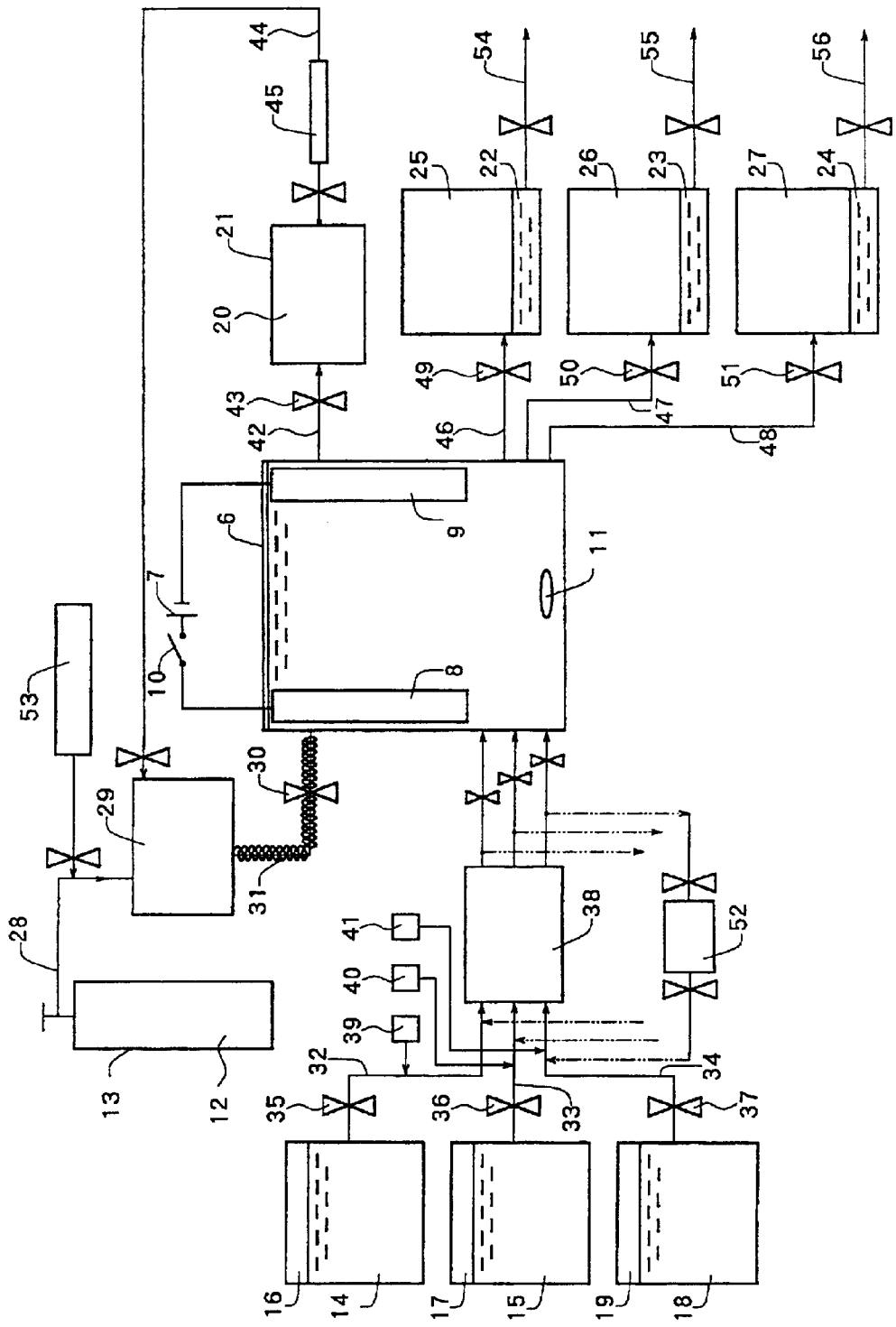
FIG. 11 is an explanatory view showing a fifth mode for carrying out the present invention, in which the multi-process of the plating treatment is executed using only one reaction vessel.
Figure 12:
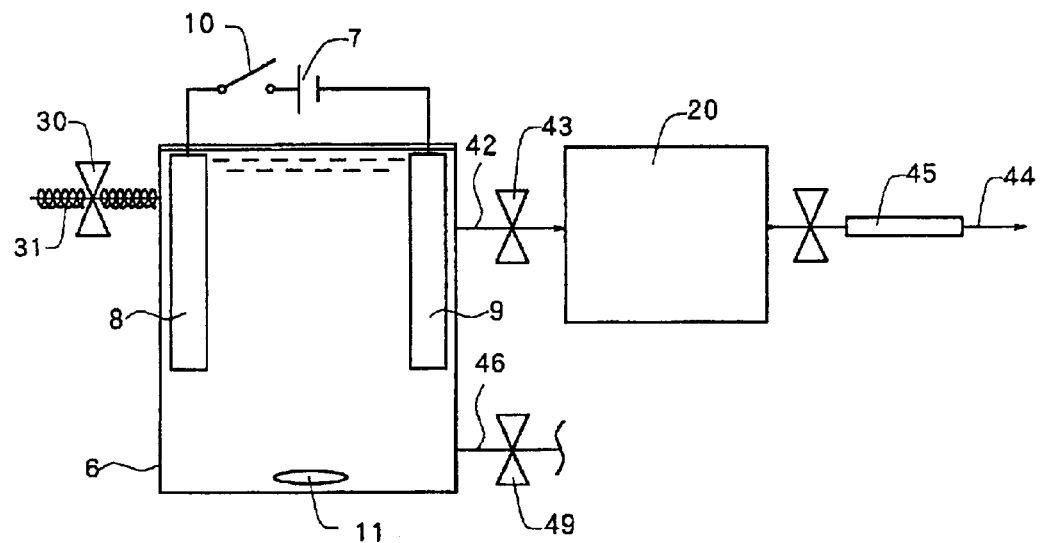
FIG. 12 is an explanatory view showing the degreasing and cleaning processes of the plating treatment in the fifth embodiment.
Figure 13:
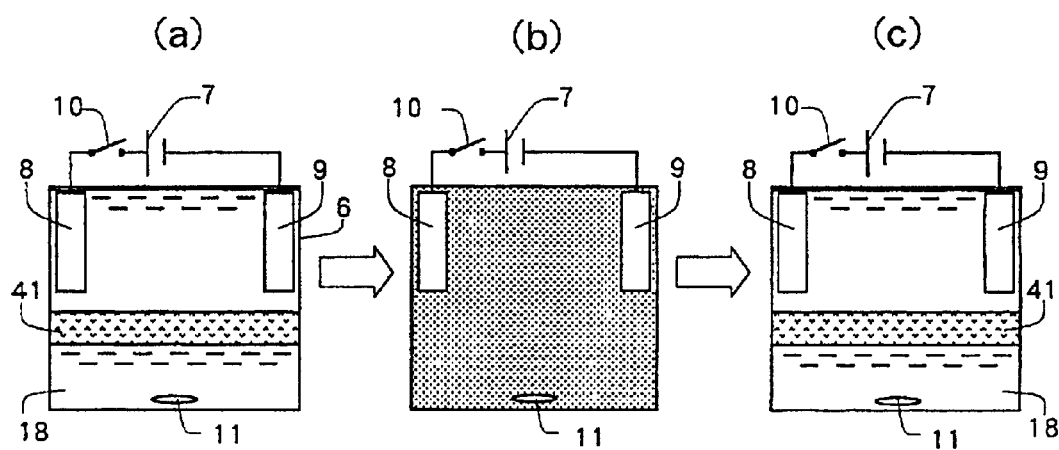
FIG. 13 is an explanatory view showing the processes for removing an oxide film resulting from the plating treatment and activating the matter to be treated, both in the fifth embodiment, in the sequential order of (a), (b) and (c).
Figure 14:
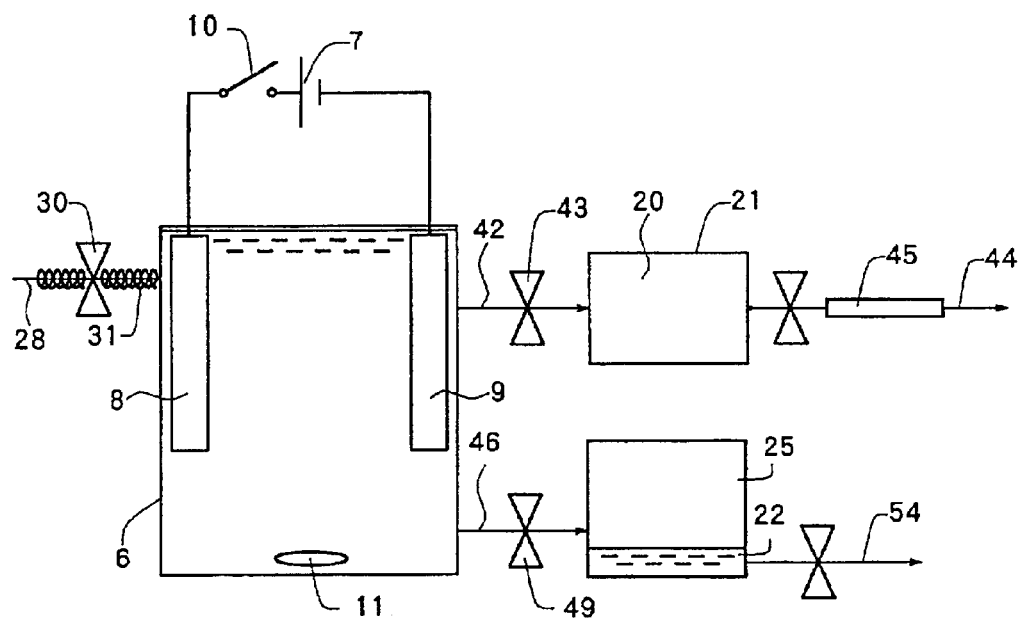
FIG. 14 is an explanatory view showing the discharging and cleaning processes for discharging the oxide solution resulting from the plating treatment in the fifth embodiment.

As shown in FIG. 7(*a*), the electrolytic solution 14 and the surface active agent 39 form two layers within the plating vessel 6. In that state, the compression pump 29 is actuated to operate the heating means 31 to open the gas tank 13, and the carbon dioxide 12 stored in the tank 13 is introduced into the compression pump 29 where the carbon dioxide is raised in pressure to such a high level as equal to or higher than its critical point. Then, the pressure increased-carbon dioxide is heated to a level equal to or higher than its critical point by the heating means 31, thereby producing a supercritical carbon dioxide. Then, the valve 30 is opened to allow the supercritical carbon dioxide to be introduced into the plating vessel 6.

The supercritical carbon dioxide introduced into the plating vessel 6 is diffused at a high speed within the plating vessel 6 and mixed with the electrolytic solution 14 and the surface active agent 39 rapidly and emulsified. The fine particles of the electrolytic solution 14 are densely diffused within the plating vessel 6 and contacted with the surface of the matter 9 to be treated.

In that state, the switch 10 is turned off to supply the electric current to the anode electrode 8 and the cathode electrode 9. Then, a pure nickel, that is an anode electrode piece, is electrolyzed and deposited in the emulsified electrolytic solution 14. The deposited pure nickel is then adhered to the surface of the matter 9 to be treated.

At that time, the agitator 11 is operated to agitate the emulsified matter to uniformly distribute the electrolytic nickel ions so that they are finely adhered to the surface of the matter 9 to be treated. This state is as shown in FIG. 7(*b*).

Since the electrolysis, deposition and adhesion of the electrolytic nickel ions are executed in a supercritical state, the electrolytic nickel ions are rapidly diffused within the plating vessel 6 and densely and uniformly distributed so as to be adhered to the upper and lower surfaces of the matter 9 to be treated.

Accordingly, the so-called adhesion power of plating is very good compared with the conventional plating method in which the anode electrode matter is electrolyzed within an electrolytic solution and then deposited and adhered. Thus, a uniform and fine plating is attained on the upper and lower surfaces of the matter 9 to be treated, thereby enabling to obtain a good finishing surface.

Hence, there is no need for taking the trouble, which is required in the conventional plating method, to separately carry out the plating on the upper and lower surfaces of the matter 9 to be treated and the productivity can be enhanced to that extent. Moreover, even in the case where the matter 9 to be treated has a complicated configuration, the present invention can easily cope with it without a need of an auxiliary electrode.

After the completion of the plating treatment, the switch 10 is turned off to stop the agitator 1 land open the valve 50. Then, the carbon dioxide is reduced in pressure and shifted into a state equal to or lower than its critical point and abruptly evaporated or liquefied. At the same time, the state of two layers of the electrolytic solution 15 and surface active agent 41 is recovered. This state is as shown in FIG. 7(*c*).

Thereafter, the valve 50 is opened to push out the used electrolytic solution 23 together with the surface active agent 39 from the plating vessel 6 and introduced into the solution reservoir vessel 26 through the conduit 47 and reserved therein.

After the electrolytic solution 23 is discharged, the valve 50 is closed and the valve 43 is opened to push out the used carbon dioxide from the plating vessel 6 and introduced into the gas reservoir vessel 21 through the conduit 42 and reserved therein.

At that time, a flow is generated in the system at the time of movement of the carbon dioxide, and the anode electrode 8 and the matter 9 to be treated are cleaned.

After the used carbon dioxide is discharged, the valve 43 is closed and the valve 30 is opened to introduce the carbon dioxide of high pressure into the plating vessel 6.

By doing so, the inside of the plating vessel 6 is raised in pressure and temperature to create a supercritical state of the carbon dioxide. This supercritical carbon dioxide is contacted with the matter 9 to be treated so as to clean and dry the moisture adhered to the matter 9 to be treated and the anode electrode 8 at a high speed and efficiently.

At that time, the agitator 11 is operated to agitate the supercritical carbon dioxide. By doing so, the diffusion is accelerated and the cleaning performance is enhanced.

After the matter 9 to be treated is cleaned and dried, the compression pump 29 is stopped to close the valve 30 so that the introduction of carbon dioxide is stopped, and the cover member (not shown) of the plating vessel 6 is opened to take out the matter 9 to be treated. By doing so, a series of plating operation is finished.

When a predetermined amount of the used carbon dioxide is reserved in the gas reservoir vessel 21, a valve located outside thereof is opened to introduce the used carbon dioxide into the column 45 through the return pipe 44 where water and fat and oil component contained in the carbon dioxide are absorbed and the carbon dioxide is reproduced into the original state. The reproduced carbon dioxide is refluxed to the compression pump 29 for reuse at an appropriate time.

Accordingly, such waste as to release the used carbon dioxide into the atmospheric air can be eliminated, and deterioration of the working environment, which would otherwise be caused by the release of the used carbon dioxide, can be prevented.

When predetermined amounts of the used acid solution 22 and the electrolytic solutions 23, 24 are reserved in the solution reservoir vessels 25 to 27, respectively, those solutions are each slightly adjusted in condensation to a higher level after being separated from the surface active agent mixed therein or without being separated therefrom. After reproduction, those solutions are refluxed to the solution vessels 16, 17, 19, respectively.

Accordingly, it is no more required to take the trouble, which was conventionally required, to carry out such a nuisance work as to pump back the plating solution, etc. and adjust the concentration after the matter 9 to be treated is recollected.

In the case where a so-called lap plating is executed in which a plurality of layers are formed on the matter 9 to be treated, it is not necessary to take out the matter 9 to be treated from the plating vessel 6 after the first layer is subjected to plating treatment. Instead, the above-mentioned treatment may be executed thereon and then, further plating treatment may simply be executed thereto.

Accordingly, it is no more required to take the trouble, which was required in the conventional lap plating, to take out the matter 9 to be treated from the plating vessel after the plating treatment is executed, and then move it to the respective vessels for preceding treatment. Thus, productivity is enhanced.

FIG. 10 shows a fourth mode for carrying out the present invention. The components corresponding to those of the above-mentioned third mode are denoted by identical reference numeral.

What is shown in FIG. 10 is only an essential part of the fourth mode. The supply and discharge of the supercritical or subcritical carbon dioxide with respect to the reaction vessels 6, 6a and the construction of the reservoir portion thereof, and the supply and discharge of each kind of solution and the construction of the reservoir portion thereof are not shown because those portions are substantially same as in FIG. 3.

In this fourth mode, a plurality of substantially identical reaction vessels 6, 6a, two in this example, are arranged in juxtaposed relation, and they are communicated with each other through conduits 57, 58. Valves 59, 60 are interposingly installed in the conduits 57, 58, respectively.

Those reaction vessels 6, 6a sequentially execute the preceding and succeeding plating treatment processes. In the reaction vessel 6, a prescribed treatment is executed. After this treatment is executed, the electrolytic solution 14, the surface active agent 39, etc. used in the reaction vessel 6 are moved into the reaction vessel 6a. In the reaction vessel 6a, the treatment executed in the reaction vessel 6 is executed. Thereafter, a series of the plating treatment processes can be executed by delaying each treatment between the plating vessels 6 and 6a.

This will be described with reference, for example, to the electroplating treatment processes shown in FIG. 7. In the first step of FIG. 10(*a*), in preparation of the electroplating treatment, the electrolytic solution 14 and the surface active agent 39 are introduced into the reaction vessel 6, while the electrolytic solution 14 and the surface active agent 39 introduced into the other vessel 6a are emulsified. In a supercritical state, the switch 10 is turned on so that nickel ions are deposited on and adhered to the surface of the matter 9 to be treated.

In the second step of FIG. 10(*b*), the electrolytic solution 14 and the surface active agent 39 are emulsified in the reaction vessel 6. In a supercritical state, the switch 10 is turned on so that nickel ions are deposited on and adhered to the surface of the matter 9 to be treated. The treatment in the reaction vessel 6a is executed after delay of one step portion.

On the other hand, in the other reaction vessel 6a, after the electroplating treatment is finished, the inside of the vessel 6a is shifted into a state equal to or lower than a critical state so that the carbon dioxide, that is a supercritical matter, is abruptly evaporated or liquefied, thereby cleaning the anode electrode 8 and the matter 9 to be treated.

In this fourth mode, the preceding and succeeding plating treatments are sequentially executed in the reaction vessels 6, 6a. At that time, the electrolytic solution 13, the acid picking solution, the surface active agent, etc. used in the preceding treatment vessel are moved into the succeeding treatment vessel so that they can be effectively utilized. Moreover, a series of the plating treatment are executed rationally and rapidly.

It should be noted here that the method for depositing and adhering the electrolyzed electrolytic matter to the other electrolytic electrode as in the above-mentioned mode, can be applied to an electroforming method and an anode electrode oxide film forming method which are same in principle as the present method, with almost the same result as mentioned above.

Moreover, the present invention can also be applied to an electrolyzing method in which electrolytic matter and electrode matter are stored in a reaction vessel and one of the electrolytic matter is electrolyzed and recollected on the other electrolytic matter side. By doing so, the present invention can be applied, for example, to electrorefining, electroextraction, and electropolishing of metal, and the like, with almost the same result as mentioned above.

The present invention can likewise be applied to an electroless plating method and a chemical conversion treatment method in which matter to be treated is stored in a reaction vessel capable of storing an electrolytic matter, the electrolytic matter contained in the electrolytic solution is deposited on and adhered to the matter to be treated, and no external electric field is supplied thereto. By doing so, almost the same effect as mentioned above can be obtained.

FIGS. 11 to 20 show a fifth mode for carrying out the present invention. The components corresponding to those of the third and fourth modes are denoted by identical reference numeral.

In this fifth mode, the present invention is applied to an electroplating treatment (nickel plating treatment), wherein a pressurized fluid such as, for example, liquefied carbon dioxide 12 or the like, that is a pressurized medium or pressurized matter, is filled about 6 MPa in the gas vessel 13 which is installed at the outside of the plating vessel 6.

The method for supplying/discharging the pressurized medium or pressurized matter, and electrolytic solution, etc., and the method for reusing thereof are basically same as the third mode. Accordingly, the construction and equipment used in the third mode can also be used here.

In this case, the pressurized matter or medium may be in the form of liquid or gas. In the case where the solvent for dissolving the electrolytic solutions 14, 15 is water, carbon dioxide which is non-toxic, safe and chemically stable, is preferable. However, the pressurized liquid of the present invention may include all liquid bodies of electrolytic solution and non-dissolvable solution.

As other pressurized matter, there can be used gases such as nitrogen, argon and the like, petroleums which are not mixed with the electrolytic solutions 14, 15 such as spindle oil, oils and fats, hexane, benzene and toluene, and halogenated hydrocarbon such as chloroform and the like.

Moreover, in the case where the solvent is an organic electrolyte such as propylene carbonate, acetnitrile, polyethylene oxide and the like, there can be used gases which do not react with those solvents, various kinds of pressurized matter which is mutually separated and whose ions are not shifted to that phase, and the like.

The pressurized matter or the pressurized solvent may be obtained by mixing plural kinds of liquids or gases. For example, by employing matter which is low in liquefying pressure, the strength of the plating vessel 6 can be eased and the plating vessel 6 can be manufactured at a low cost.

The compression pump 29 can pressurize the carbon dioxide 12 to a predetermined pressure level, namely the level of 1 to 8 MPa in this example, which is equal to or higher than the atmospheric pressure but equal to or lower than the supercritical pressure.

The carbon dioxide 12 can be introduced into the plating vessel 6 in its pressurized and liquefied state before each treatment process of plating operation, namely, degreasing treatment, oxygen film removing treatment or so-called acid picking treatment, plating treatment and drying treatment after the plating treatment, and at the time of cleaning treatment with respect to the plating vessel 6 and the cathode electrode 9 which is executed between two treatment processes mentioned above.

A heating means 31 such as a heater is disposed on the downstream side of the conduit 28. This heating means 31 is adapted to heat the carbon dioxide 12 to the level of 0 to 31 degrees C. that is equal to its critical temperature or lower.

The density ratios of the liquefied carbon dioxide with respect to the acid solution 18 and the electrolytic solutions 14, 15 are set to 1:5 to 5:1 so that the emulsified state by the surface active agent can be uniformed.

In the fifth mode, since the multi-process of plating treatment is executed in only one plating vessel, the construction can be simplified, the installation space can be made compact and the equipment cost can be lowered compared with the conventional plating treatment method.

Moreover, the various discharges, which are discharged from the plating treatment, are discharged into the plural solution storage vessels 25 to 27, so that it can be avoided to discharge them to the outside. Moreover, the various discharges are processed rationally. Accordingly, an expensive and large-sized liquid waste processing equipment, which was conventionally required, is no more required.

Moreover, since the above-mentioned various treatments are executed using the pressurized and liquefied carbon dioxide which has a good diffusability, the amount of acid solution and electrolytic solution to be used can be reduced compared with the conventional plating method in which the matter to be treated is immersed in a plating solution. And the discharging treatment equipment can be designed small in size and light in weight.

Moreover, since the invented apparatus uses non-toxic, safe and chemically stable liquid carbon dioxide as the pressurized liquid matter, the pressuring means and heating means can be reduced in performance compared with the case where the electroplating is executed in a supercritical state.

Moreover, since the all-purpose compression pump 29 is used as means for pressuring the plating vessel 6 and a large-scaled pressurizing apparatus containing therein a piston is no more required, the equipment can be designed small and light in weight. Moreover, energy can be saved and the operation cost can be lowered.

Accordingly, the pressure resisting strength can be eased to the extent of the reduced pressure, compared with the plating vessel 6 in the supercritical state. Thus, this can be manufactured at a low cost.

In the case where the electroplating is executed using such an electrochemical reaction apparatus as described above, the preceding treatment processes as in the above-mentioned third mode is employed. And the liquefied carbon dioxide is introduced into each treatment with the same function and effect as described above. The description thereof is omitted in order to avoid a duplicated description. Instead, characteristic electroplating time will be described hereinafter.

After the matter 9 to be treated is subjected to the preceding treatment process and dried, the gas tank 13 is opened to actuate the compression pump 29, so that the liquefied carbon dioxide 12 stored in the gas tank 13 is properly pressurized (1 to 8 MPa) and heated, and then introduced into the plating vessel 6.

When the pressurized liquid carbon dioxide is introduced into the plating vessel 6, it is rapidly mixed with the electrolytic solution 14 and the surface active agent 39 and emulsified. Then, fine particles thereof are densely diffused within the plating vessel 6 and contacted with the surface of the matter 9 to be treated.

In that state, the switch 10 is turned off to supply the electric current to the anode electrode 8 and the cathode electrode 9. Then, a pure nickel, that is an anode electrode piece, is electrolyzed and deposited in the emulsified electrolytic solution 14. The deposited pure nickel is then adhered to the surface of the matter 9 to be treated.

At that time, the agitator 11 is operated to agitate the emulsified matter to uniformly distribute the electrolytic nickel ions so that they are finely adhered to the surface of the matter 9 to be treated.

In this case, since the electrolysis, deposition and adhesion of the electrolytic nickel ions are executed in the plating vessel 6 which is under pressure, the electrolytic nickel ions are rapidly diffused within the plating vessel 6 and uniformly distributed so as to be adhered to the upper and lower surfaces of the matter 9 to be treated.

Accordingly, the so-called adhesion power of plating is good compared with the conventional plating method in which the anode electrode matter is electrolyzed, deposited and adhered in an electrolytic solution under normal pressure. Thus, a uniform and fine plating is attained on the upper and lower surfaces of the matter 9 to be treated, thereby enabling to obtain a good finishing surface.

Hence, there is no need for taking the trouble, which is required in the conventional plating method, to separately carry out the plating on the upper and lower surfaces of the matter 9 to be treated and the productivity can be enhanced to that extent. Moreover, even in the case where the matter 9 to be treated has a complicated configuration, the present invention can easily be executed without a need of an auxiliary electrode.

On the other hand, at the time of such plating treatment as mentioned above, a hydrogen gas and an oxygen gas are produced by electric decomposition of the electrolytic solution, i.e., water, and bubbles thereof are stayed on the surface to be treated or moved thereon by the above-mentioned agitating operation. As a result, plating omission and non-uniform plating occur.

At the time of electrolysis of the electrolytic solution or water, the solution is changed into a gaseous large volume from a small volume of liquid. However, under pressure as in this example where the inside of the plating vessel 6 is pressurized by the carbon dioxide, the above-mentioned reaction is shifted in a direction of the small volume so that the electrolysis can be suppressed.

Accordingly, generation of the hydrogen gas and oxygen gas is suppressed, thereby suppressing an occurrence of a state in which bubbles stay and move on the surface of the matter 9 to be treated. By this, the plating omission and non-uniform plating can be prevented from occurring.

Also, under the above-mentioned pressure, the hydrogen gas and oxygen gas are increased in dissolving degree with respect to the electrolytic solution 14. Accordingly, the amount of the hydrogen gas and oxygen gas adhered to and stayed on the surface of the matter 9 to be treated is reduced. Thus, this feature in cooperation with the above-mentioned features, can prevent the occurrence of plating omission and non-uniform plating more efficiently.

Moreover, under the pressure as mentioned above, the bubbles of the hydrogen gas and oxygen gas are squeezed into a finer size or squashed. Accordingly, there can be obtained a fine and uniform thin plating film on the surface of the matter to be treated compared with the conventional plating method in which the plating is executed under the atmospheric pressure. In addition, since the plating solution penetrates into every fine part of the matter to be treated, plating of a through-hole plating can be executed easily.

Accordingly, even if the amounts of a plating metal and an electrodeposition matter, which are used for the matter to be treated, are reduced, the same plating as the conventional plating can be obtained. The present invention is especially advantageous for plating precious metals.

Moreover, since the generated gases are squeezed into a finer size as mentioned above, the surface active agent acts efficiently and the gasses adhered to the surface of the matter 9 to be treated are peeled off rapidly, thereby accelerating their dissolving in the electrolytic solution 14. This feature in cooperation with the above-mentioned features prevents the occurrence of plating omission and non-uniform plating.

On the other hand, since the present invention suppresses the electrolysis of water at the time of plating as previously mentioned, the consumption of electric energy can be saved to that extent and the saved energy can be used for plating and electrodeposition, the electric current efficiency is enhanced.

Moreover, in the plating vessel 6 under pressure, the inside liquid is compressed, the ion concentration per unit volume is increased and the value of electric resistance is lowered. Accordingly, the generation of Joule heat is reduced. This feature in cooperation with the above-mentioned features further enhances the electric current efficiency.

Even if the inside of the plating vessel 6 is pressurized and the electrolysis of the water is suppressed in the manner as mentioned above, no adverse effect is prevailed on the electrochemical reaction of plating. Instead, the electric current efficiency is enhanced and a good thin plating can be obtained.

Figure 18:
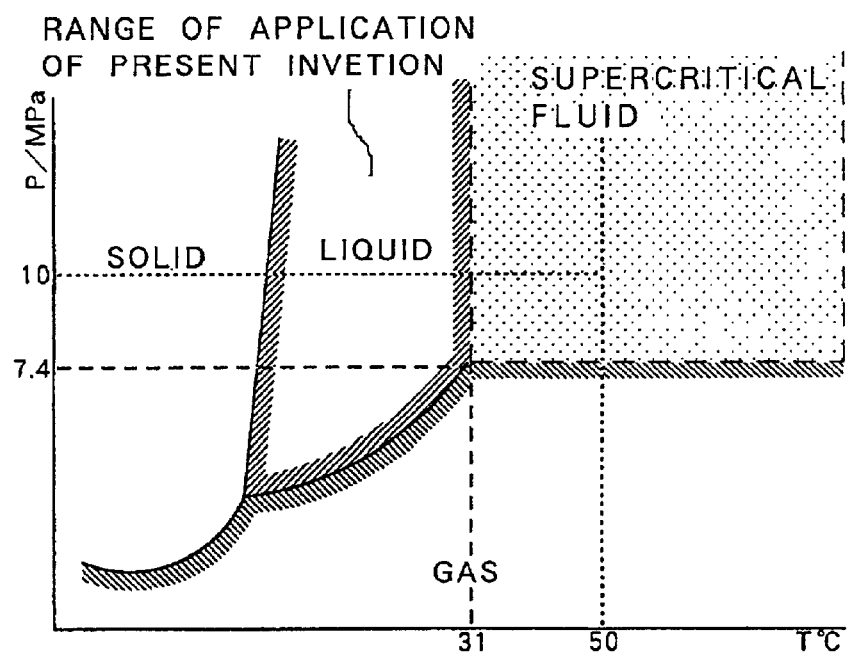
FIG. 18 is a phase diagram showing the range of application to the plating treatment in the fifth embodiment.

FIG. 18 shows the range of application of the fifth mode, in which the electroplating is executed in an emulsified state of the liquid phase which is lowered in temperature and pressure than the supercritical state.

Accordingly, the pressuring means and the heating means can be more reduced in performance than in a case where the plating is executed in a supercritical state. The equipment can be designed small in size and light in weight and the equipment cost can be reduced. Moreover, owing to energy saving, the operation cost can be reduced.

Moreover, before and after the electroplating, the preceding treatment processes, the discharge of the various used solutions, cleaning and drying of the plating vessel 6, the matter 9 to be treated and the electrode 8 are realized by supply/discharge of the liquefied carbon dioxide, as mentioned previously.

Figure 19:
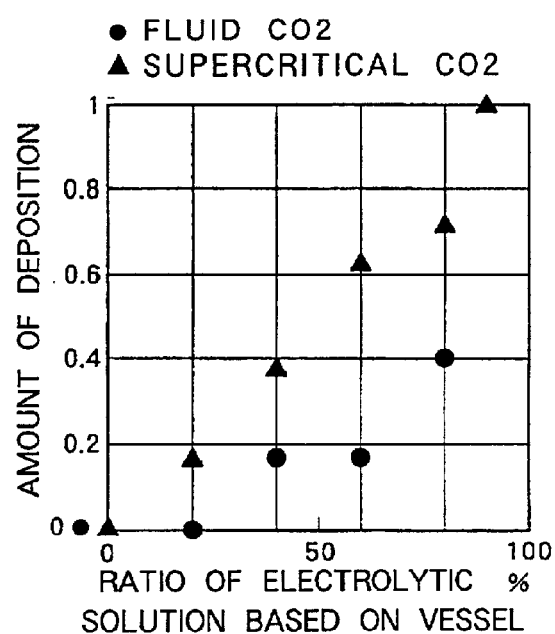
FIG. 19 is a characteristic diagram showing an amount of deposition of plating with respect to the electrolytic solution at the time of executing the plating treatment using a liquid carbon dioxide in the fifth embodiment, in which the above-mentioned amount of deposition is compared with the amount of deposition of plating using a supercritical carbon dioxide.
Figure 20:
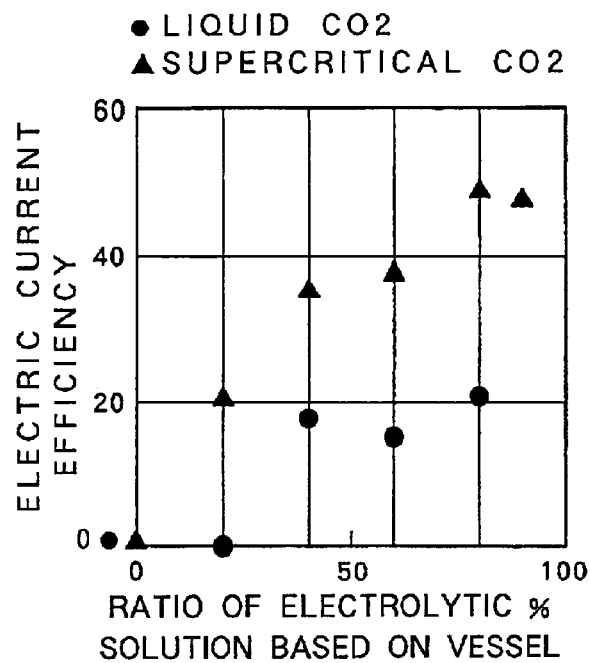
FIG. 20 is a characteristic diagram showing the electric current efficiency with respect to the amount of the electrolytic solution at the time of executing the plating treatment using a liquid carbon dioxide in the fifth embodiment, in which the above-mentioned electric current efficiency is compared with the electric current efficiency using a supercritical carbon dioxide.

The characteristics of the electroplating in the fifth mode are as shown in FIGS. 19 and 20.

Of these two Figures, FIG. 19 shows the characteristics in which the amount of deposition of plate at the time of executing the electroplating by pressuring the liquefied carbon dioxide is compared with the amount of deposition of plate at the time of executing the electroplating in a supercritical state. FIG. 19 shows that the plating executed by pressuring the liquefied carbon dioxide is almost as good as the plating executed in a supercritical state. Moreover, since the electric current efficiency in this mode is enhanced as later described, the plate is efficiently deposited. In FIG. 19, the amount of deposition at the time of 90% of the supercritical phase is indicated by 1.

FIG. 20 shows the characteristics in which the electric current efficiency based on the electrolytic solution at the time of executing the electroplating by pressuring the liquid carbon dioxide is compared with the electric current efficiency at the time of executing the electroplating by use of the supercritical carbon dioxide. It is ascertained that although the plating executed by pressuring the liquid carbon dioxide is inferior, as a whole, to the plating executed in a supercritical state of the carbon dioxide, the present invention is superior to the conventional electroplating method.

Figure 15:
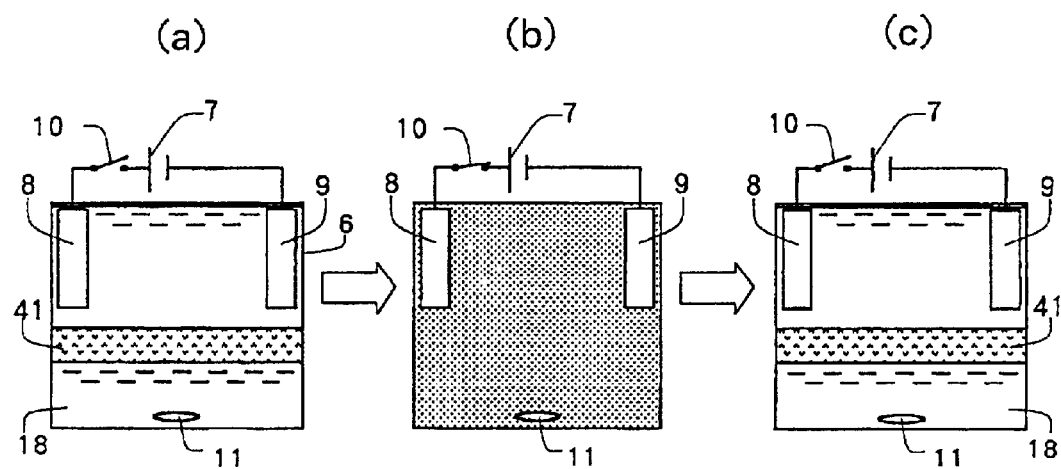
FIG. 15 is an explanatory view showing the plating process of the plating treatment in the fifth embodiment in the sequential order of (a), (b) and (c).
Figure 16:
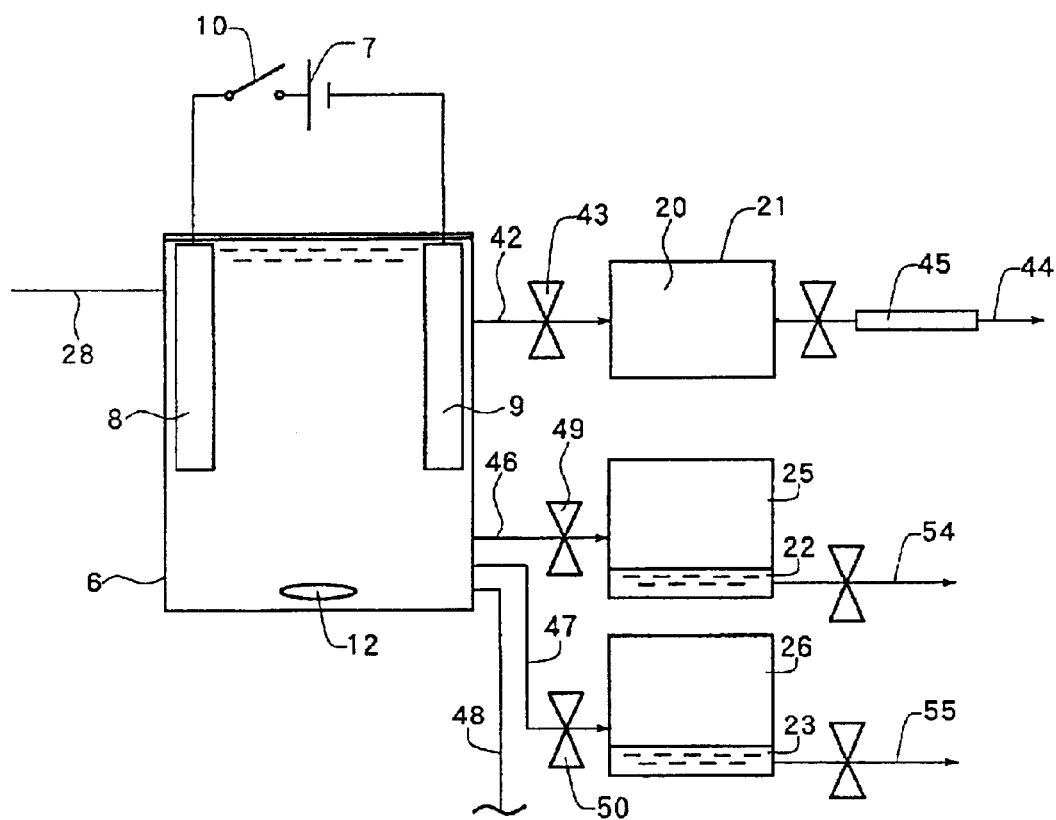
FIG. 16 is an explanatory view showing the discharging and cleaning processes for discharging the electrolytic solution resulting from the plating treatment in the fifth embodiment.
Figure 17:
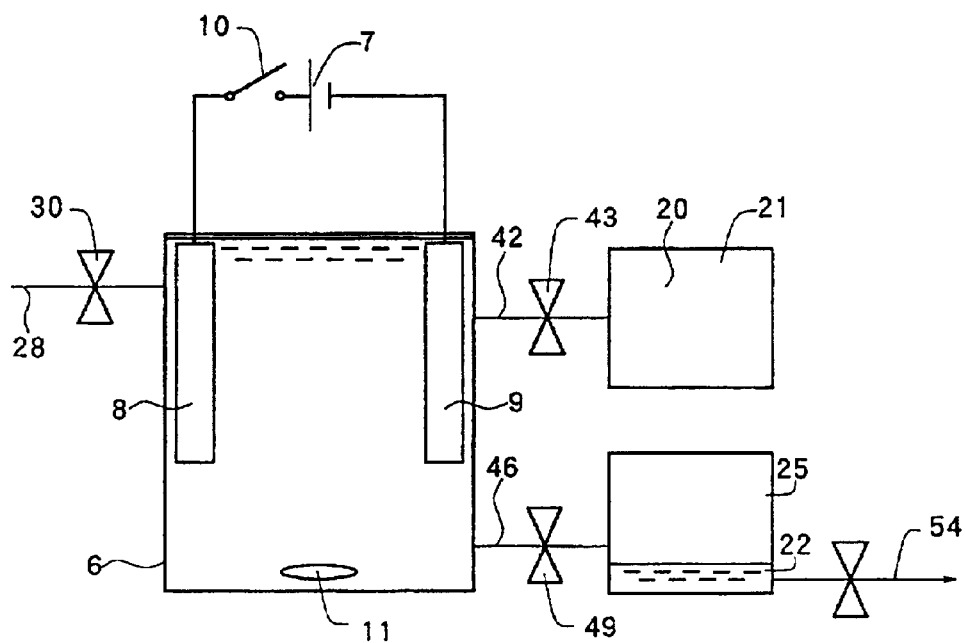
FIG. 17 is an explanatory view showing the drying and cleaning processes of the plating treatment in the fifth embodiment.

After the plating process is finished, when the switch 10 is turned off to stop the operation of the agitator 11 and the valve 50 is opened, the carbon dioxide is reduced in pressure and the emulsified state is disappeared. And the electrolytic solution 15 and the surface active agent 39 recover the two-layer state. This state is as shown in FIG. 15($c$).

Thereafter, the valve 45 is opened to push out the used electrolytic solution 18 together with the surface active agent 39 from the plating vessel 6 so that the solution 18, etc. thus pushed out are introduced into the solution reservoir vessel 26 through the conduit 47 and reserved therein.

After the electrolytic solution 23 is discharged, the valve 50 is closed and the valve 43 is opened to push out the used liquefied carbon dioxide from the plating vessel 6 so that the same is introduced into the gas reservoir vessel 21 through the conduit 42 and reserved therein.

At that time, a flow is generated in the system at the time of movement of the carbon dioxide, and the anode electrode 8 and the matter 9 to be treated are cleaned.

After the used carbon dioxide is discharged, the valve 43 is closed and the liquefied carbon dioxide 12 is introduced into the plating vessel 6.

By doing so, the carbon dioxide is contacted with the matter 9 to be treated so that the moisture adhered to the matter 9 to be treated and the anode electrode 8 is cleaned efficiently.

At that time, the agitator 11 is operated to agitate the liquefied carbon dioxide. By doing so, the cleaning performance is enhanced.

After the matter 9 to be treated is cleaned and dried, the compression pump 29 is stopped and the valve 30 is closed so that the introduction of the liquefied carbon dioxide is stopped, and the cover member (not shown) of the plating vessel 6 is opened to take out the matter 9 to be treated. By doing so, a series of plating operation is finished.

Figure 21:
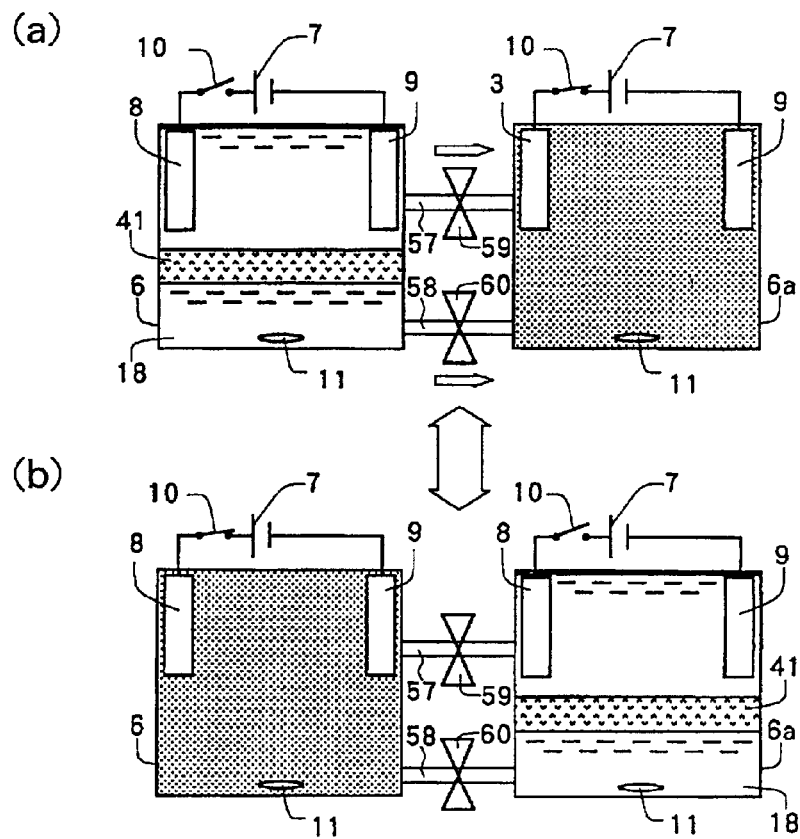
FIG. 21 is an explanatory view showing an essential part of a sixth mode for carrying out the present invention, in which the respective plating treatments are executed using two reaction vessels.

FIG. 21 shows a sixth mode for carrying out the present invention. The components corresponding to those of the above-mentioned modes especially the fourth mode, are denoted by identical reference numeral.

What is shown in FIG. 21 is only an essential part of the sixth mode. The supply and discharge of the pressurized liquid carbon dioxide with respect to the reaction vessels 6, 6a and the construction of the reservoir portion thereof, and the supply and discharge of each kind of solution and the construction of the reservoir portion thereof are not shown.

In this sixth mode, a plurality of substantially identical reaction vessels 6, 6a, two in this example, are arranged in juxtaposed relation, and they are communicated with each other through conduits 57, 58. Valves 59, 60 are interposingly installed in the conduits 57, 58, respectively.

Those reaction vessels 6, 6a sequentially execute the preceding and succeeding plating treatment processes. In the reaction vessel 6, a prescribed treatment process is executed. After this treatment process is executed, the electrolytic solution 14, the surface active agent 39, etc. used in the reaction vessel 6 are moved into the reaction vessel 6a where the same treatment as in the reaction vessel 6 is executed. Thereafter, a series of the plating treatment processes can be executed by delaying one treatment process between the plating vessels 6 and 6a.

This will be described with reference, for example, to the electroplating treatment processes shown in FIG. 15. In the first step of FIG. 15(*a*), in preparation of electroplating, the electrolytic solution 14 and the surface active agent 39 is introduced into the reaction vessel 6, while the electrolytic solution 14 and the surface active agent 39 introduced into the other vessel 6a are emulsified. In a supercritical state, the switch 10 is turned on so that nickel ions are deposited on and adhered to the surface of the matter 9 to be treated.

In the second step of FIG. 21(*b*), the electrolytic solution 14 and the surface active agent 39 are emulsified in the reaction vessel 6. In a supercritical state, the switch 10 is turned on so that nickel ions are deposited on and adhered to the surface of the matter 9 to be treated. The treatment in the reaction vessel 6a is executed by delaying one step portion.

On the other hand, in the other reaction vessel 6a, after the electroplating treatment is finished, the inside of the vessel 6a is shifted into a state equal to or lower than a critical state so that the carbon dioxide, that is a supercritical matter, is abruptly evaporated or liquefied, thereby cleaning the anode electrode 8 and the matter 9 to be treated.

In this sixth mode, the preceding and succeeding plating treatments are sequentially executed in the reaction vessels 6, 6a. At that time, the electrolytic solution 13, the acid picking solution, the surface active agent, etc. used in the preceding treatment vessel are moved into the succeeding treatment vessel so that they can be effectively utilized. Moreover, a series of the plating treatments are executed rationally and rapidly.

It should be noted here that the method for depositing and adhering the electrolyzed electrolytic matter to the other electrode matter as in the above-mentioned mode, can be applied to an electroforming method and an anode electrode oxide film forming method which are same in principle as the present method, with almost the same result as mentioned above.

Moreover, the present invention can also be applied to an electrolyzing method in which electrolytic matter and electrode matter are stored in a reaction vessel and one of the electrode matter is electrolyzed and recollected on the other electrode matter side. By doing so, the present invention can be applied, for example, to electrorefining, electroextraction, and electropolishing of metal, and the like, with almost the same result as mentioned above.

INDUSTRIAL APPLICABILITY

As described hereinbefore, a method of electrochemical treatment such as electroplating, etc. and an electrochemical reaction apparatus thereof according to the present invention can be applied to methods and apparatuses such as electroplating, electroforming, formation of an anode electrode film, electropolishing, electrochemical machining, electrophoretic coating, electrorefining and the like in which electrodes are installed in a reaction vessel to be reacted and an external electric field is supplied thereto. The present invention can likewise be applied to electroless plating, chemical conversion treatment in which no external electric field is supplied thereto.

What is claimed is:

1. A method of electrochemical treatment comprising introducing an electrode, a substance which is in a subcritical state, and small amounts of electrolytic solution and, for emulsification purpose, surfactant into a reaction vessel such that said electrode is not in contact with said electrolytic solution, thereafter shifting said substance into a supercritical state, and electrolyzing said electrolytic solution thereby to effect electrochemical reaction, and said electrolytic solution being in uniformly emulsified condition when said electrochemical reaction takes place.

2. A method of electrochemical treatment according to claim 1, wherein reservoir vessels communicable with said reaction vessel are disposed exterior to said reaction vessel, and used said substance, used said electrolytic solution and/or used cleaning solution are stored in said reservoir vessels.

3. A method of electrochemical treatment according to claim 2, wherein said used substance stored in said reservoir vessels is regenerated and recycled to said reaction vessel and/or said used electrolytic solution and/or used cleaning solution stored in said reservoir vessels is regenerated and recycled to other reservoir vessels.

4. A method of electrochemical treatment according to claim 1, further comprising a pretreatment process and wherein said electrochemical reaction and said pretreatment process are executed in one reaction vessel.

5. A method of electrochemical treatment comprising introducing an electrode, a fluid which is in a subcritical state, and small amounts of electrolytic solution and, for emulsification, surfactant into a reaction vessel such that said electrode is not in contact with said electrolytic solution, thereafter pressurizing said reaction vessel to a level equal to or higher than atmospheric pressure but not higher than supercritical pressure of said fluid, and electrolyzing said electrolytic solution thereby to effect electrochemical reaction, said fluid and said electrolytic solution being in uniformly emulsified condition when said electrochemical reaction takes place.

6. A method of electrochemical treatment according to claim 5, further comprising pressurizing said fluid before introducing said fluid into said reaction vessel.

7. A method of electrochemical treatment according to claim 5, wherein reservoir vessels conmmunicable with said reaction vessel are disposed exterior to said reaction vessel, and used said pressurized fluid, used said electrolytic solution and/or used cleaning solution are stored in said reservoir vessels.

8. A method of electrochemical treatment according to claim 5, wherein said used pressurized fluid stored in said reservoir vessels is regenerated and recycled to said reaction vessel and/or said used electrolytic solution and/or used cleaning solution stored in said reservoir vessels is regenerated and recycled to other reservoir vessels.

9. A method of electrochemical treatment according to claim 5, further comprising a pretreatment process and wherein said electrochemical reaction and said pretreatment process are executed in one reaction vessel.

10. An apparatus for electrochemical reaction, the apparatus comprising a reaction vessel and an electrode received in the reaction vessel, the reaction vessel being adapted to receive a substance which is in a subcritical state and small amounts of electrolytic solution and, for emulsification purpose, surfactant, said apparatus being configured so that said electrolytic solution is received in said reaction vessel without contacting said electrode, means for shifting said substance in said reaction vessel into a supercritical state, and means for electrolyzing said electrolytic solution when said substance and said electrolytic solution are in uniformly emulsified state so that electrochemical reaction takes place.

11. An apparatus for electrochemical reaction according to claim 10, further comprising reservoir vessels communicable with said reaction vessel and disposed exterior to said reaction vessel, the reservoir vessels being adapted to receive used said substance, used said electrolytic solution and/or used cleaning solution.

12. An apparatus for electrochemical reaction of electroplating, according to claim 11, further comprising other reservoir vessels, means for regenerating said used substance which was stored in said reservoir vessels, means for recycling said regenerated substance to said reaction vessel, means for regenerating said used electrolytic solution and/or said used cleaning solution which was stored in said reservoir vessels and means for recycling said regenerated electrolytic solution and/or cleaning solution to said other reservoir vessels.

13. An apparatus for electrochemical reaction according to claim 10, further comprising means for conducting a pretreatment process and wherein said apparatus is adapted for carrying out said electrochemical reaction and said pretreatment process in said one and the same reaction vessel.

14. An apparatus for electrochemical reaction according to claim 13, further comprising at least a second reaction vessel, said reaction vessels being arranged is as to be capable of executing said electrochemical reaction and said pretreatment process as well as a post treatment process or an electrolyzing process of said electrolytic solution, and wherein said reaction vessels are arranged to allow preceding and succeeding treatment processes therein, pretreatment and post treatment processes therein, and sequential treatment processes therein reaction.

15. An apparatus for electrochemical reaction according to claim 14, further comprising means for transporting from said first reaction vessel to said second reaction vessel, after a prescribed treatment process is executed in said first reaction vessel said electrolytic solution, a cleaning solution or surfactant for a succeeding treatment process in said second reaction vessel.

16. An apparatus for electrochemical reaction comprising a reaction vessel, an electrode received in said reaction vessel, said reaction vessel being adapted to receive a substance which is in a subcritical state and small amounts of electrolytic solution and, for emulsification purpose, surfactant, for emulsification purpose, Without said electrolytic solution contacting said electrode, means for pressurizing said reaction vessel to a level equal to or higher than atmospheric pressure but not higher than critical pressure of said substance, and means for electrolyzing said electrolytic solution when said substance and said electrolytic solution and in uniformly emulsified state so that electrochemical reaction takes place.

17. An apparatus for electrochemical reaction according to claim 16, wherein the substance is a pressurized liquid and the apparatus further comprises means for introducing the pressurized liquid into said reaction vessel and means for pressurizing said reaction vessel to a level equal to or higher than atmospheric pressure but not higher than a supercritical pressure of said pressurized liquid.

18. An apparatus for electrochemical reaction according to claim 16, further comprising reservoir vessels communicable with said reaction vessel and disposed exterior to said reaction vessel, and reservoir vessels for receiving used said pressurized liquid, used said electrolytic solution or cleaning solution.

19. An apparatus for electrochemical reaction according to claim 16, further comprising other reservoir vessels, means for regenerating used said pressurized liquid stored in said reservoir vessels and recycling the regenerated liquid to said reaction vessel and means for regenerating used said electrolytic solution or cleaning solution stored in said reservoir vessels and recycling said regenerated solutions to said other reservoir vessels.

20. An apparatus for electrochemical reaction according to claim 16, further comprising means for carrying out preceding and succeeding treatment processes and wherein said reaction vessel is adapted for the carrying out therein of said preceding and succeeding processes as well as said electrochemical reaction.

21. An apparatus for electrochemical reaction according to claim 16, further comprising at least a second reaction vessel, said reaction vessels being adapted for executing said electrochemical reaction and preceding and succeeding treatment processes or an electrolyzing process of said electrolytic solution and preceding and succeeding treatment processes thereof, and said reaction vessels being adapted for executing said preceding and succeeding treatment processes sequentially.

22. An apparatus for electrochemical reaction according to claim 16, further comprising means for transporting from said first reaction vessel, after a prescribed treatment process is executed in said first reaction vessel, said electrolytic solution, cleaning solution or surfactant to said second reaction vessel, where a succeeding treatment process is to be carried out.

\* \* \* \* \*